United States Patent
Fujisawa

(10) Patent No.: US 10,554,723 B2
(45) Date of Patent: Feb. 4, 2020

(54) HTTP SERVER, METHOD FOR CONTROLLING THE SAME, AND IMAGE FORMING APPARATUS

(71) Applicant: CANON KABUSHIKI KAISHA, Tokyo (JP)

(72) Inventor: Kunimasa Fujisawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 15/180,386

(22) Filed: Jun. 13, 2016

(65) Prior Publication Data

US 2016/0381115 A1    Dec. 29, 2016

(30) Foreign Application Priority Data

Jun. 24, 2015  (JP) ................. 2015-126872

(51) Int. Cl.
*G06F 15/16* (2006.01)
*H04L 29/08* (2006.01)
*H04L 29/06* (2006.01)

(52) U.S. Cl.
CPC ............ *H04L 67/02* (2013.01); *H04L 67/289* (2013.01); *H04L 67/2814* (2013.01); *H04L 69/162* (2013.01)

(58) Field of Classification Search
CPC ....... H04L 67/02; H04L 67/12; H04L 67/143; H04L 67/42; H04L 67/14; H04L 67/28; H04L 67/2842; H04L 67/34; H04L 67/325; H04L 63/10; H04L 63/20; H04L 63/08; H04L 63/0892
USPC ........ 709/203, 213, 221, 225, 228, 234, 245
See application file for complete search history.

(56) References Cited

U.S. PATENT DOCUMENTS

| | | | |
|---|---|---|---|
| 2001/0054157 A1* | 12/2001 | Fukumoto | H04L 63/0281 726/11 |
| 2003/0177236 A1* | 9/2003 | Goto | H04L 29/12009 709/225 |
| 2005/0154922 A1* | 7/2005 | Chen | G06F 21/31 726/4 |
| 2008/0304486 A1* | 12/2008 | Graessley | H04L 65/608 370/392 |
| 2010/0165392 A1* | 7/2010 | Yabe | G06F 21/6218 358/1.15 |
| 2011/0302298 A1* | 12/2011 | Lawrance | H04L 12/2697 709/224 |
| 2013/0204988 A1* | 8/2013 | Grewal | H04L 65/105 709/221 |
| 2013/0318155 A1* | 11/2013 | Ichikawa | H04L 67/02 709/203 |

(Continued)

FOREIGN PATENT DOCUMENTS

JP      2005-031725 A      2/2005

OTHER PUBLICATIONS

R. Herriot, et al., "RFC 2910 Internet Printing Protocol/1.1: Encoding and Transport," available at https://tools.ietf.org/html/rfc2910.

*Primary Examiner* — Farzana B Huq
(74) *Attorney, Agent, or Firm* — Venable LLP

(57) ABSTRACT

If a host name and a port number of an HTTP request do not correspond to those of an HTTP server, it is determined whether or not the host name indicates a local host and an address of a client that has transmitted the request is a loop-back address, and if so, processing for the HTTP request is continued.

9 Claims, 19 Drawing Sheets

(56) References Cited

U.S. PATENT DOCUMENTS

| | | | | |
|---|---|---|---|---|
| 2014/0118789 A1* | 5/2014 | Kadota | ................... | G06F 3/121 |
| | | | | 358/1.15 |
| 2014/0129674 A1* | 5/2014 | Matsuda | ............... | H04L 69/321 |
| | | | | 709/217 |
| 2014/0139877 A1* | 5/2014 | Ohara | ................... | G06F 3/1293 |
| | | | | 358/1.15 |
| 2015/0304459 A1* | 10/2015 | Pakula | ................... | H04L 67/02 |
| | | | | 709/203 |
| 2015/0358328 A1* | 12/2015 | Kaplan | ............... | H04L 67/1095 |
| | | | | 726/6 |

\* cited by examiner

HTTP SERVER, METHOD FOR CONTROLLING THE SAME, AND IMAGE FORMING APPARATUS

BACKGROUND OF THE INVENTION

Field of the Invention

The present invention relates to an HTTP server capable of setting an information processing apparatus via a USB interface, a method for controlling the same, and an image forming apparatus.

Description of the Related Art

Internet Printing Protocol (IPP) (RFC 2910 Internet Printing Protocol/1.1: Encoding and Transport, URL:https://tools.ietf.org/html/rfc2910) is known as a technique for printing to a remote printer connected via the Internet. A technique called "IPP over USB", in which printing is performed to a printer connected to a PC via a USB interface using an IPP protocol is known as an expansion of the IPP. Meanwhile, a client residing outside a network segmented by a router cannot directly access a server that resides inside the network segmented by the router and has been given a private address. Accordingly, there is a technique called "port mapping", in which an intermediate server for mediating the connection between the outside and the inside of the network (i.e., connection between networks) assigns the connection to the inside server based on the number of the port accessed from the outside (Japanese Patent Laid-Open No. 2005-31725).

In IPP over USB, when a web browser on a PC attempts to connect to a remote UI of an image forming apparatus (hereinafter, referred to as "MFP") via a USB interface, the connection is realized via the following routes.

(1) On the PC, a virtual server is started for each MFP connected to a USB interface. For each MFP, an appropriate number (for example, 54321 or 54322) is assigned to the number of the port at which the virtual server runs.

(2) The web browser on the PC accesses the virtual server. At this time, an HTTP protocol has the host header "Host:localhost:54321" because the virtual server within the PC is to be accessed.

(3) The virtual server converts a request from the web browser into a USB packet without changing it, and transmits the request to the MFP using the USB interface.

(4) Upon receiving the packet from the USB interface, a USB-TCP conversion module that is running on the MFP converts data included in the USB packet directly into a TCP/IP packet. The converted packet is transmitted to an HTTP server that is running at the port with the number 8000 (port 8000) on the MFP, the HTTP server realizing the remote UI.

(5) The HTTP server attempts to process the request received from the USB-TCP conversion module, but the host header transmitted from the web browser on the PC is "Host:localhost:54321".

Here, for the HTTP server running at the port 8000, the request with "Host:localhost:54321" is a bad request in HTTP, and thus the HTTP server cannot perform HTTP processing. The request received from the client via the virtual server can be prevented from being a bad request by starting, on the MFP, an HTTP server that runs at the port with the same port number as the port number (for example, 54321) of the port at which the virtual server on the PC runs.

SUMMARY OF THE INVENTION

However, for each PC connected to MFPs, a number unique to each USB port is assigned to the port number of a virtual server. Therefore, it is difficult to start, on the MFP side, the HTTP server that is to run at the port with the same port number as the number of the port at which the virtual server on the PC is running.

The present invention was made in view of the above-described conventional example, and enables an HTTP server that has received a request complying with IPP over USB to perform appropriate processing.

The present invention has the following configurations.

An HTTP server connected to a client configured to transmit an HTTP request via a proxy server located in the same device as the client, the HTTP server including: a determination unit configured to determine whether or not a received HTTP request is a request in which the HTTP server is designated or a request transmitted via the proxy server; and a processing unit configured to perform processing in accordance with the HTTP request if it is determined by the determination unit that the received HTTP request is one of the requests, and perform error processing if it is determined that the received HTTP request is neither of the requests.

According to the present invention, the HTTP server that has received a request complying with IPP over USB can perform appropriate processing.

Further features of the present invention will become apparent from the following description of exemplary embodiments with reference to the attached drawings.

DESCRIPTION OF THE EMBODIMENTS

Hereinafter, embodiments for implementing the present invention will be described with reference to the drawings.

First Embodiment

Hardware Configuration of System

Figure 1:
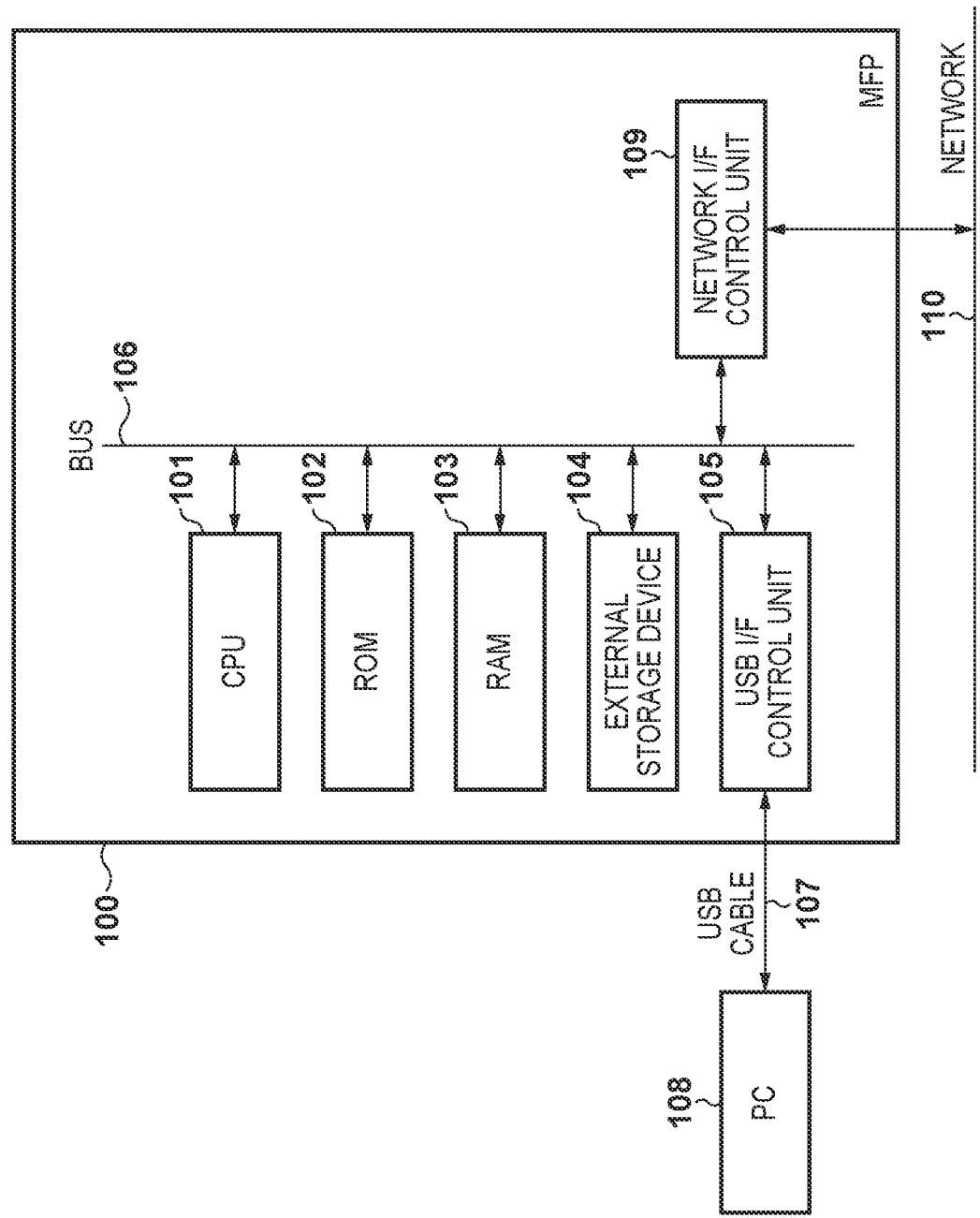
FIG. 1 is a diagram illustrating a configuration of a system in which the present invention is implemented.

FIG. 1 is a diagram illustrating a configuration of a system according to the present embodiment. This system is constituted by an MFP 100 and a PC 108 connected thereto via a USB cable 107. The MFP 100 includes a CPU 101 that implements software for realizing the present invention, a ROM 102 in which the software for realizing the present invention is stored, a RAM 103 in which the software for realizing the present invention is stored in an executable format, an external storage device 104 into which the software for realizing the present invention stores data, a USB I/F control unit 105 for controlling a USB interface, and a network I/F control unit 109. The above-described modules are connected to each other and perform data communication via a bus 106. The MFP 100 is connected to a network 110 by the network I/F control unit 109.

Software Configuration of System

Figure 2:
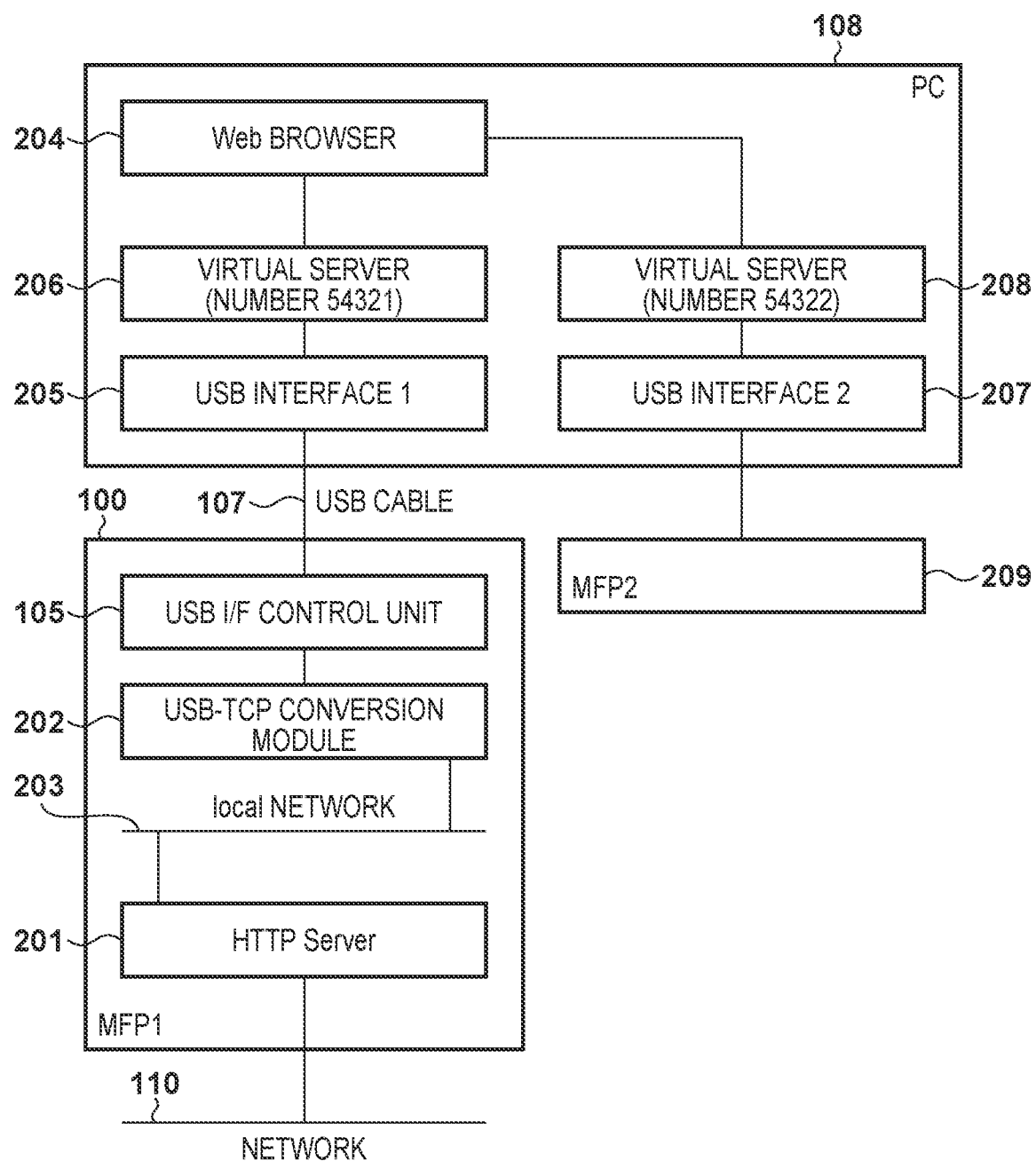
FIG. 2 is a diagram illustrating a configuration of software of the system in which the present invention is implemented.

FIG. 2 is a diagram illustrating a software configuration of the present embodiment. On the MFP 100, an HTTP server 201 and a USB-TCP conversion module 202 operate. The HTTP server 201 and the USB-TCP conversion module 202 are connected to each other via a local network 203. The local network 203 may be a physical network, or a logical or virtual network for connecting the software modules via an interface complying with the network. Examples of the local network 203 include an IP network in which a predetermined loop-back address is designated. The HTTP server 201 is connected to the network 110 by the network I/F control unit 109. The USB-TCP conversion module 202 is loaded from the ROM 102 onto the RAM 103, and is executed by the CPU 101. Furthermore, a USB packet is transmitted and received using the USB I/F control unit 105.

On the PC 108, a USB interface 205 connected to the MFP 100 via the USB 107, a virtual server 206 to which the port number 54321 is assigned, and a web browser 204 operate. The operations thereof will be described later with reference to FIG. 4 and the like. Furthermore, the PC 108 has a plurality of USB ports, and has another USB interface 207 to which an MFP 209 is connected and at which a virtual server 208 with the assigned port number 54322 runs. Note that the web browser 204 of the PC 108 is a client of the HTTP server, and thus the web browser 204 or the PC 108 may be referred to also as "client". Furthermore, the virtual server 206 may also be referred to as "proxy server".

In such a configuration, it is possible to print to the MFP 100 from the PC 108 using IPP over USB. Furthermore, if, instead of the PC 108, a printer server having a USB port to which the MFP 100 is connected is connected to the network, it is possible to print to the MFP 100 using IPP over USB from a remote client via this printer server. Note that "IPP" is an HTTP-based technique as described in the background art, and communication between the HTTP client (web browser) and the HTTP server is executed in accordance with HTTP. That is, an IPP message is transmitted from the client to a device such as the MFP, that is, the image forming apparatus 100 using a TCP/IP-based HTTP. Then, the image forming apparatus 100 processes the HTTP data in compliance with the IPP standard, and thereby executes printing in accordance with the message. The present embodiment is based on IPP over USB, but a description will be given with a focus on HTTP because the invention of the present embodiment is to solve the HTTP-related non-conformity that occurs due to IPP over USB.

HTTP Server

Figure 3:
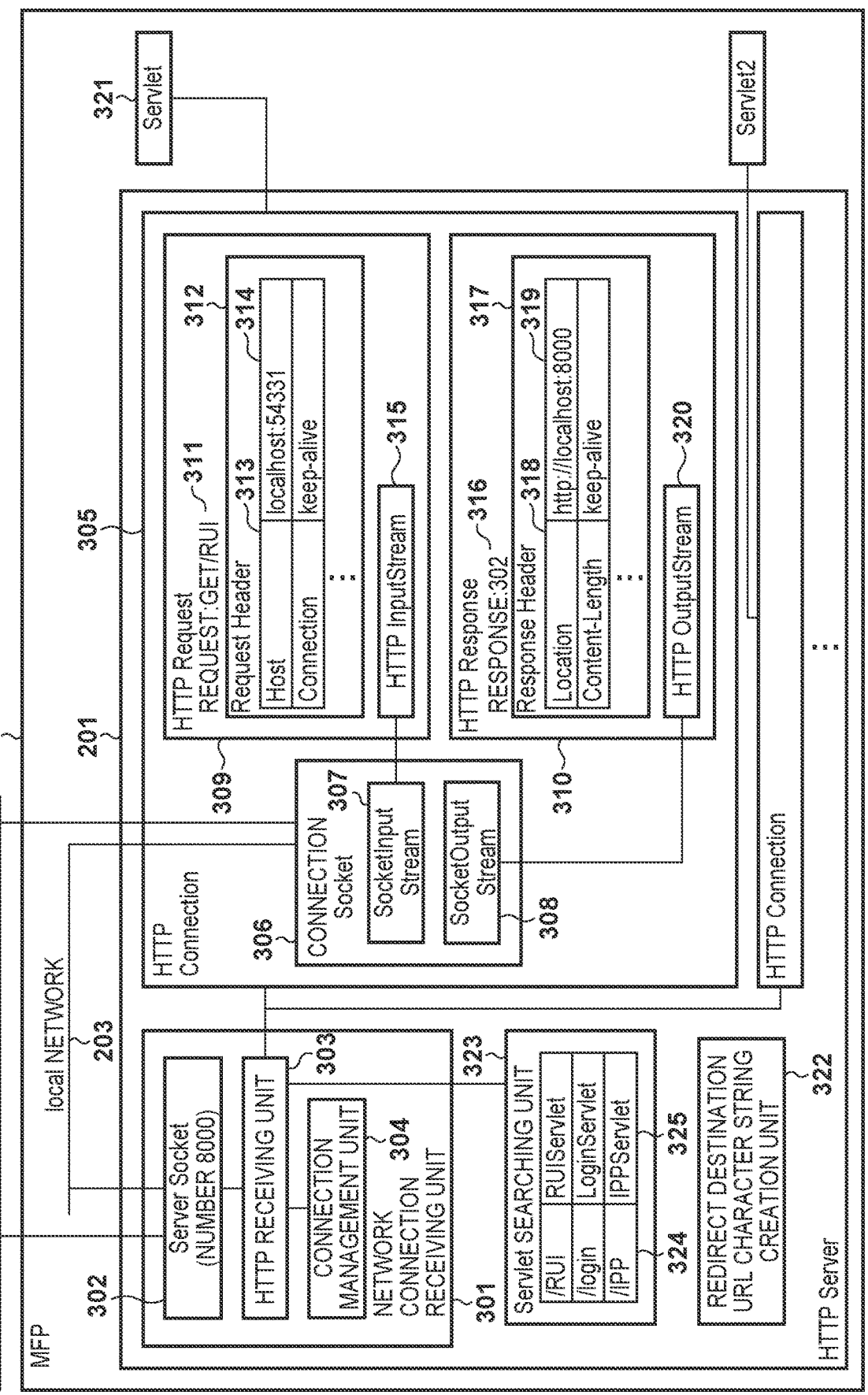
FIG. 3 is a diagram illustrating a configuration of software of an HTTP server that realizes a remote UI according to the present invention.

FIG. 3 is a diagram illustrating a software configuration of the HTTP server 201. The HTTP server 201 includes a network connection receiving unit 301, one or more HTTP connection 305, which is not an essential component, a redirect destination URL character string creation unit 322, and a servlet searching unit 323. Note that a servlet 321 is a program module added to the HTTP server 201, and provides, for example, a service for dynamically creating a web page, or the like.

The network connection receiving unit 301 waits for connection to the port 8000 from the network 110 and the local network 203. A server socket 302 is also provided that generates a connection socket 306 for communicating with the client when the client connects to the port 8000. According to the present embodiment, the server socket 302 waits for the connection at the port 8000, but may use another numbered port. The connection socket 306 has a socket input stream 307 and a socket output stream 308 respectively for reading and writing communication data. The socket 306 is, for example, an API for realizing communication using connection, and communication is made via this API, and thus FIG. 3 shows such that the connection socket 306 is connected to the network 110 and the local network 203. Furthermore, "stream" refers to a class or function provided for inputting or outputting data, and, for example, the socket input stream is defined as a class such as "SocketInputStream". However, in the present embodiment, the term "stream" is used in a more general meaning without depending on such a specific language processing system. In other words, "input stream" refers to, for example, a method for reading data from a file and the data, and "output stream" refers to, for example, a method for writing data to a file and the data. Note that in the drawings, for example, the input stream is denoted by "InputStream", and the output stream is denoted by "OutputStream".

The network connection receiving unit 301 receives an HTTP request read from the socket input stream 307. The network connection receiving unit 301 further includes an HTTP receiving unit 303 that interprets an HTTP protocol, checks authentication information, and generates the HTTP connection 305. The HTTP server 201 further includes a connection management unit 304 that stores the HTTP connection 305 generated by the HTTP receiving unit 303 until communication of the HTTP connection 305 ends.

The HTTP receiving unit 303 also sets information on the connection socket 306, the socket input stream 307, and the socket output stream 308 for the generated HTTP connection 305. The HTTP receiving unit 303 reads an HTTP request header from the socket input stream 307 of the connection socket 306. Furthermore, the HTTP receiving unit 303 sets the read HTTP request header in a request header table 312 of an HTTP request 309 of the HTTP connection 305.

The HTTP connection 305 is a connection specified by a so-called 5-tuple, which is ordinarily a set composed of IP addresses and TCP port numbers of a sender and a destination, and a protocol (HTTP in FIG. 3). In FIG. 3, the connection specified by such parameters is realized via a logical communication line between the HTTP server 201 and the servlet 321, but in actuality communication is realized between programs (or processes or threads) executed by the same device. Accordingly, the HTTP connection is actually a memory region for realizing the communication by means of reading and writing with respect to the memory region, for example. In the HTTP connection 305, an HTTP request and an HTTP response are exchanged between the HTTP server and the servlet. For example, reception of the HTTP request by the servlet is performed by an HTTP request object executing a predetermined method, and similarly transmission of the HTTP response is performed by an HTTP response object executing a predetermined method. In the description below, data such as the HTTP request and the HTTP response will be described without being particularly distinguished from the objects. Accordingly, for example, the HTTP response may be described as an object to be transmitted or received as if it is data, or the HTTP response may be described as a subject that executes processing.

The network connection receiving unit 301 interprets an HTTP protocol, acquires an HTTP method and a request URL, and reads an HTTP request header. Furthermore, the servlet searching unit 323 is used to determine the servlet that corresponds to the request URL. The network connection receiving unit 301 sets (connects) the determined servlet for the HTTP connection 305. The HTTP connection 305 stores the connection socket 306 set by the HTTP receiving unit 303. The HTTP connection 305 stores the HTTP request 309 and an HTTP response 310, which constitute a logical line.

The HTTP request 309 stores the servlet 321 that was acquired from the servlet searching unit 323 or stores information specifying the servlet 321, using the HTTP method, request URL, and request URL that were acquired by the HTTP receiving unit 303, as keys. The HTTP request 309 has the request header table 312 including a request header name 313 and a request header value 314. The HTTP request 309 includes an HTTP input stream 315 according to which the servlet 321 is to read data.

The servlet 321 acquires a request header from the request header table 312 in accordance with the processing of the servlet. The HTTP input stream 315 is a stream that wraps the socket input stream 307. Therefore, the HTTP input stream 315 includes the socket input stream 307, and can further use an additional function and the like. The servlet 321 reads a request body from the HTTP input stream 315, and performs processing.

The HTTP response 310 includes a response 316, and a response header table 317 constituted by a response header name 318 and a response header value 319. The HTTP response 310 further includes an HTTP output stream 320 according to which the servlet 321 is to write data.

The servlet 321 adds a response header to the response header table 317 in accordance with the processing of the servlet. The response 316 and the added response header are transmitted to the client by the socket output stream 308 before the servlet transmits the response body. The HTTP output stream 320 is a stream that wraps the socket output stream 308. That is, the HTTP output stream 320 includes the function and information provided by the socket output stream 308. The servlet 321 writes the response body to the HTTP output stream 320, and transmits it to the client.

The redirect destination URL character string creation unit 322 creates a character string of the redirect destination URL that is to be set in a location header, which is a response header, when the servlet transmits a redirect response. The servlet searching unit 323 has a correspondence table of the request URL and the servlet, and transmits the corresponding servlet upon receiving a servlet request from the HTTP receiving unit 303 using the request URL as an argument.

Example of Data to be Transmitted from Web Browser to HTTP Server

Figure 4:
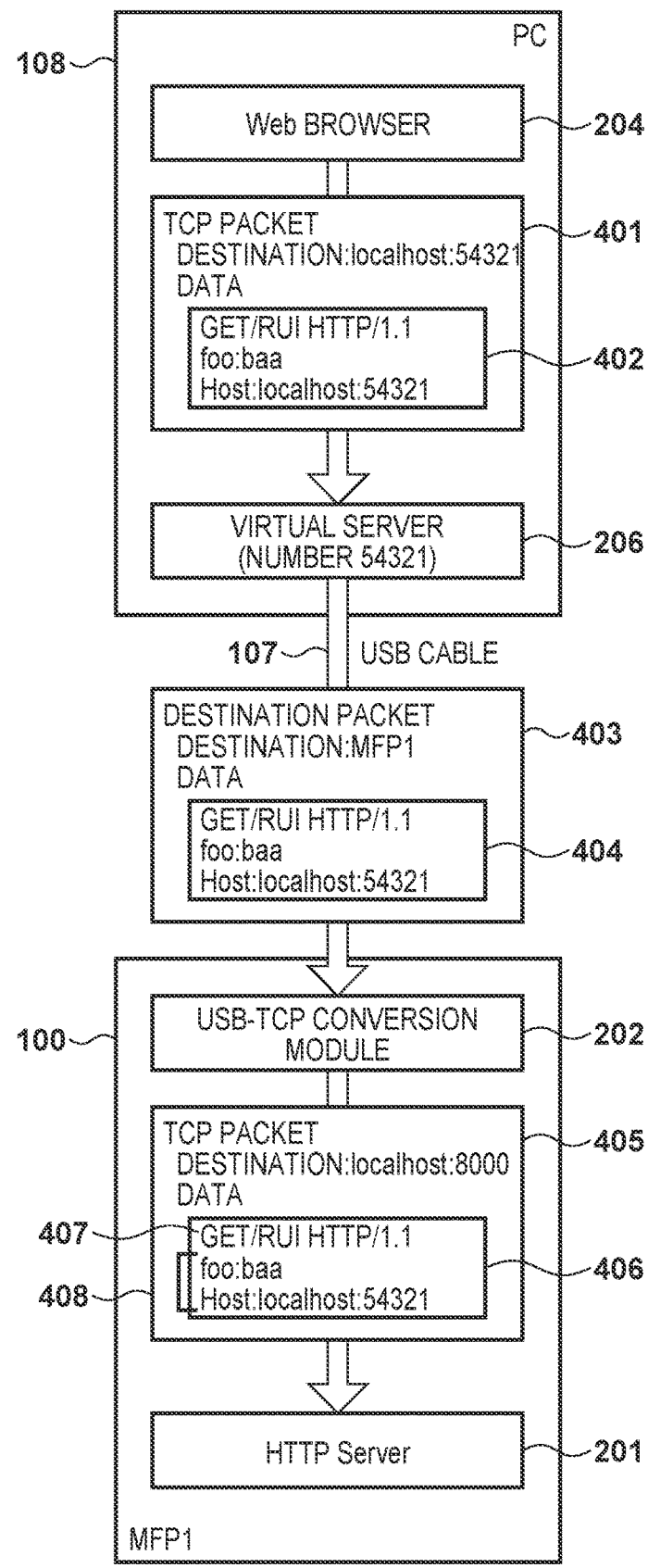
FIG. 4 is a diagram illustrating data to be transmitted from a web browser to the HTTP server, according to a first embodiment.

FIG. 4 is a diagram illustrating an example of data to be transmitted from the web browser 204 to the HTTP server. For example, when a user prints to the MFP 100 from the web browser 204 using IPP over USB, the user designates a predetermined access destination, for example, the virtual server 206 on the web browser 204, and attempts to access it.

Accordingly, the web browser 204 running on the PC 108 transmits a request serving as a TCP packet 401 to the virtual server 206 running at the port with the number 54321 (port 54321) on the same PC 108.

The destination of the TCP packet 401 is the virtual server 206 running at the port 54321 of the same PC, and thus the pair of the destination IP address and the TCP port is "localhost:54321". Furthermore, the host header value of HTTP protocol data 402 included in the TCP packet is also "localhost:54321", which indicates the virtual server 206 running at the port 54321 of the same PC. The host header is included in a command of the HTTP request, and includes a host name and a port number. The host header may also be referred to as identification information for specifying a server (or a service) requested by the client. The host name "localhost" refers to a loop-back device, that is, the current device itself (PC 108 in this example), and is assigned ordinarily to "127.0.0.1" in IPv4, and to "::1" in IPv6. That is, these are loop-back addresses or local addresses indicating the same loop-back device.

Processing by Virtual Server

Figure 19:
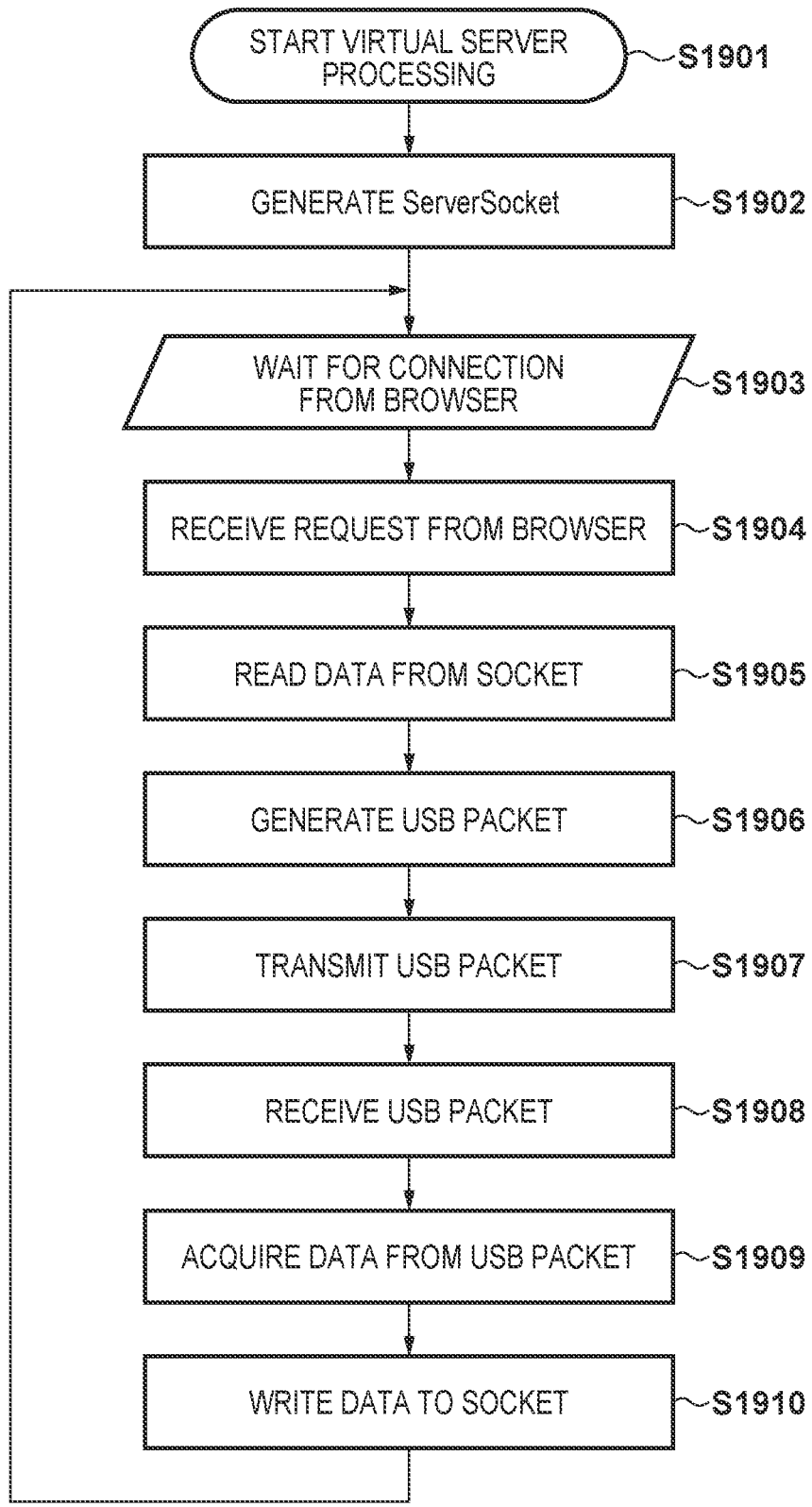
FIG. 19 is a flowchart of packet conversion processing by the virtual server.

The virtual server 206 performs processing shown in FIG. 19, and generates and transmits a USB packet 403 based on the TCP packet 401 received from the web browser 204.

When the virtual server 206 is started (step S1901), the virtual server 206 opens the server socket at the port with the number designated at the start, for example, at the port 54321 (step S1902). Then, the virtual server 206 waits for connection from the web browser 204 (step S1903). The start of the virtual server 206 may be, for example, at the same time as the start of the web browser, or may be triggered by the start of the PC 108.

When the virtual server 206 is connected from the web browser 204 and receives a request (step S1904), the virtual server 206 reads data of the request from the web browser 204 from the socket (step S1905). The request that is received in step S1904 corresponds to the TCP packet 401 of FIG. 4. The virtual server 206 generates the USB packet 403 based on the data read in step S1905 (step S1906), and transmits the USB packet 403 using the USB interface 205 (step S1907).

Furthermore, the virtual server 206 waits for response data to be transmitted back from the USB interface 205, and receives a USB packet of the response data (step S1908). Then, the virtual server 206 acquires data from the USB packet acquired in step S1908 (step S1909), and writes the acquired data to the socket (step S1910), and the procedure moves to step S1902, where the virtual server 206 waits for next connection from the web browser 204.

Here, the USB packet 403 generated by the virtual server 206 has, as destination information, a predetermined address and port number that are assigned to the MFP connected via the USB cable 107. Furthermore, the USB packet 403 has, as data 404, the same data as the HTTP protocol data included in the data portion 402 of the TCP packet 401. In other words, the content of the host header is passed from the TCP packet to the USB packet.

Processing by USB-TCP Conversion Module

Figure 18:
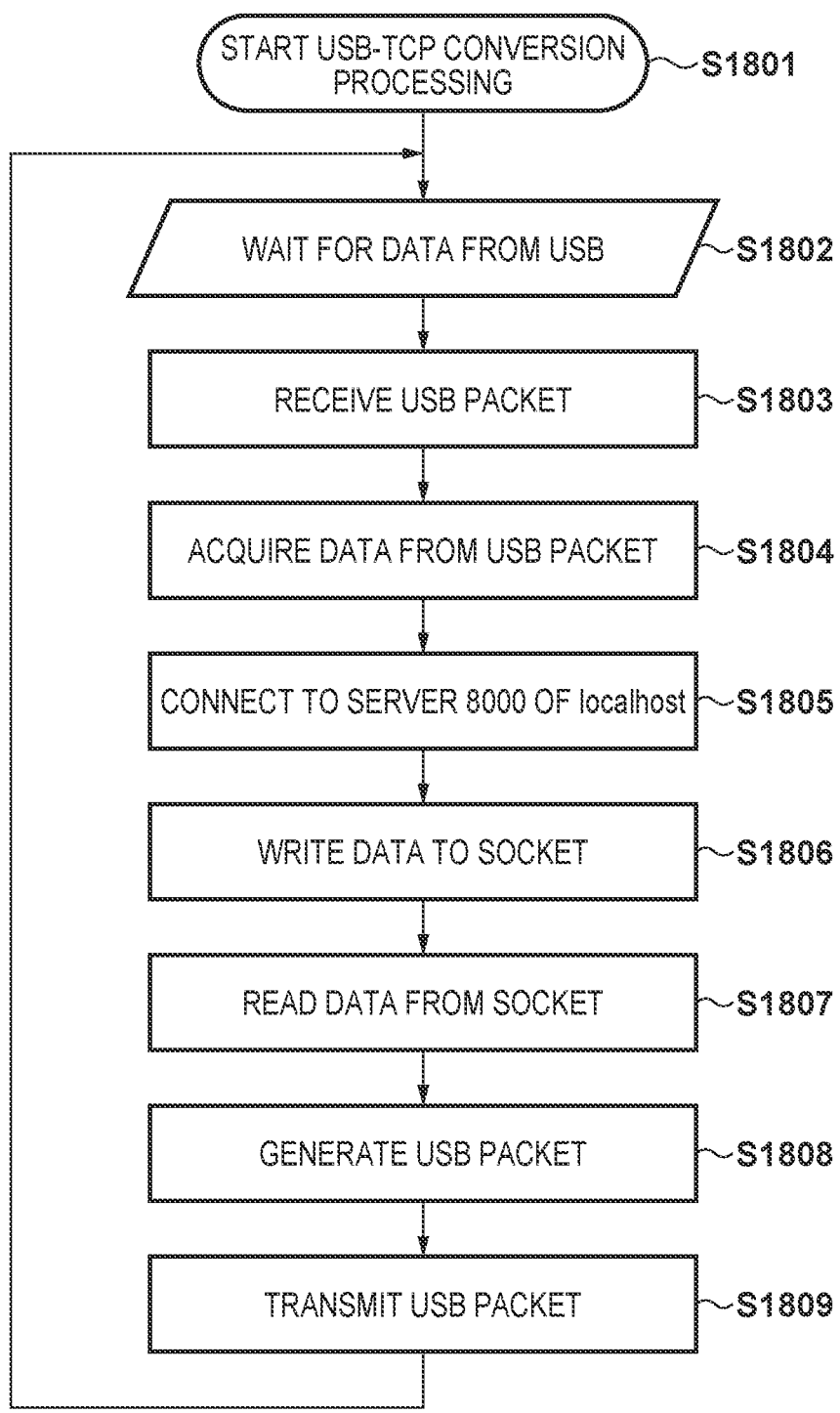
FIG. 18 is a flowchart of packet conversion processing by a USB-TCP conversion module.

The USB packet transmitted from the virtual server 206 to the USB interface 205 is received by the USB-TCP conversion module 202 via the USB interface 205 and the USB I/F control unit 105. After receiving the USB packet 403, the USB-TCP conversion module 202 performs processing of FIG. 18 and generates a TCP packet 405. Furthermore, the USB-TCP conversion module 202 transmits a request to the HTTP server 201 via the local network 203.

When the USB-TCP conversion module 202 is started (step S1801), the USB-TCP conversion module 202 waits for reception of data from a USB (step S1802). The USB-TCP conversion module 202 is started, for example, at the same time as the start of the MFP 100.

When the USB-TCP conversion module 202 receives data from the virtual server 206, the procedure moves to step S1803, where the USB-TCP conversion module 202 receives the USB packet 403 (step S1803). The USB-TCP conversion module 202 acquires the data 404 from the USB packet 403 (step S1804). The USB-TCP conversion module 202 connects to the HTTP server 201 running at the port with the number 8000 (port 8000) of the same MFP (step S1805), and writes the data to the socket obtained by the connection (step S1806). The data written in step S1806 is transmitted as the TCP packet 405 to the HTTP server 201 via the local network 203. The destination of the TCP packet 405 is the HTTP server 201 running at the port 8000 of the same MFP 100, which is the device in which the USB-TCP conversion module 202 runs, and thus has "localhost:8000".

On the other hand, HTTP protocol data 406 included in the TCP packet 405 has the host header value "localhost:54321" because the data 404 of the USB packet 403 is transmitted as it is. Accordingly, the destination of the packet changes in the order of "localhost:54321", "MFP1", and "localhost:8000" at the virtual server 206 and the USB-TCP conversion module 202, whereas the host header value remains as "localhost:54321".

Figure 5:
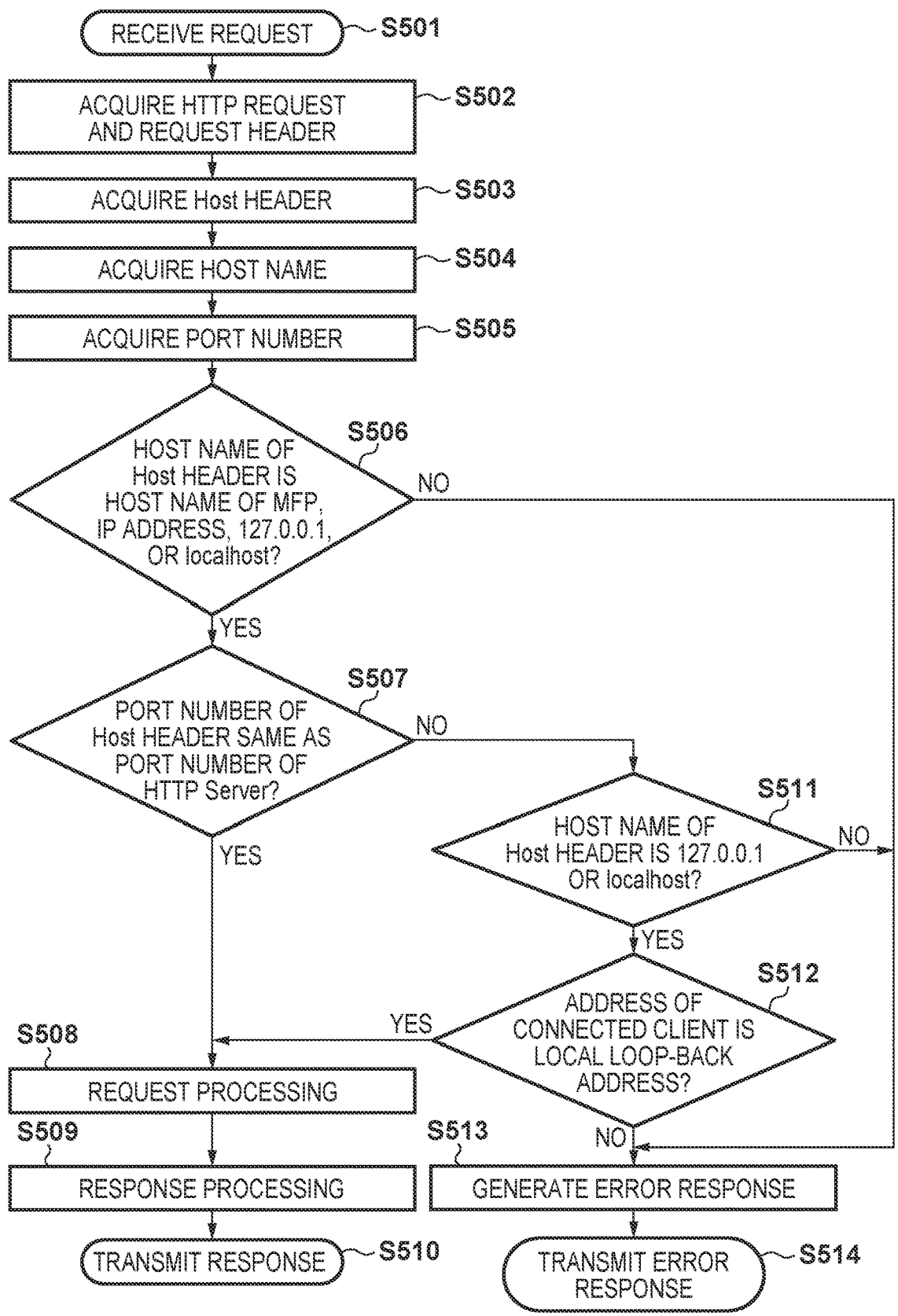
FIG. 5 is a flowchart of processing of the first embodiment.

FIG. 5 is a flowchart of host header check processing that is performed when the HTTP server 201 receives a request. When the HTTP server 201 receives the TCP packet 405, the HTTP receiving unit 303 starts processing for receiving a request for the HTTP protocol data 406 (step S501).

The HTTP receiving unit 303 reads the HTTP protocol data 406, and acquires an HTTP request and a request header. Then, the HTTP receiving unit 303 generates the HTTP connection 305, and sets the values of the connection socket, the HTTP request 407, and the request header 408 in the HTTP request 309 of the HTTP connection 305 (step S502). The HTTP request 407 is constituted by a request (method) for the server, a URL indicating the request destination, and HTTP version information, and describes what kind of request is to be given to which resource on the server. The request header 408 is for notifying the server of attribute information associated with the request.

The HTTP receiving unit 303 acquires the host header value stored in the request header table 312 of the HTTP request 309 of the HTTP connection 305 (step S503).

The HTTP receiving unit 303 acquires, from the host header acquired in step S503, a host name (step S504) and also a port number (step S505). The HTTP receiving unit 303 checks whether or not the host name acquired in step S504 corresponds to the host name of the MFP 100, the IP address of the MFP 100, "localhost", or "127.0.0.1" (step S506). If the host name of the HTTP request header corresponds to the host name of the MFP 100 or the IP address of the MFP 100, this packet is addressed to the MFP1. On the other hand, if the host name is "localhost" or "127.0.0.1", that is, a loop-back address, it can be determined that this is a packet transmitted to the MFP 100 via the virtual server 206 for use of IPP over USB. If it is determined in step S506 that the host name of the host header is the host name of the MFP 100, the IP address of the MFP 100, "localhost", or "127.0.0.1", that is, if the packet is a packet to be received by the MFP 100, the procedure moves to step S507, and otherwise to step S513.

In step S507, the HTTP receiving unit 303 checks whether or not the port number of the host header acquired in step S505 is the number of the port at which the HTTP server 201 runs (or the port number of the port whose connection is observed by the HTTP server). If it is determined in step S507 that the port numbers are equal to each other, that is, the packet is a packet addressed to the HTTP server 201, the procedure moves to step S508, and if they are not equal to each other, the procedure moves to step S511. If the received HTTP request is addressed to the virtual server 206 (that is, proxy server) and is forwarded therefrom, the determination of step S507 is NO, and the procedure is branched to step S511. Accordingly, when the procedure is branched to step S511, there is a possibility that an HTTP request is received by IPP over USB. In step S511, the HTTP receiving unit 303 checks whether or not the host name acquired in step S504 is "localhost" or "127.0.0.1", that is, a loop-back address. The loop-back address is used for the packet that is received via the virtual server 206, for use of IPP over USB. Accordingly, if the host name acquired is "localhost" or "127.0.0.1", that is, if there is a possibility that it is a packet complying with IPP over USB, the procedure moves to step S512. If the host name is not "localhost" or "127.0.0.1", it is determined that this packet is a wrong packet, and the procedure moves to step S513.

In step S512, the HTTP receiving unit 303 checks whether or not the address of the client that has connected to the HTTP server 201, that is, the sender address of the request, is a local loop-back address (step S512). The sender address is a local loop-back address when the sender is the USB-TCP conversion module 205. If the sender address is a local loop-back address, it can be determined that this packet is a packet complying with IPP over USB, and the procedure moves to step S508, where HTTP processing is performed. If the sender address is not a local loop-back address, the request is determined as having an incorrect host header, and the procedure moves to step S513, where error processing is performed.

In step S508, using the request URL of the HTTP request 407 as a key, the HTTP receiving unit 303 acquires the servlet 321 that performs processing from the servlet searching unit 323 and requests the servlet 321 to perform the processing (step S508). Upon receiving the request, the servlet 321 generates response data (step S509), and transmits the generated response data to the client (step S510).

In step S513, the HTTP receiving unit 303 generates an error response, and transmits the error response to the client (step S514).

In this procedure, the host header value of the HTTP protocol data 406 included in the TCP packet 405 of FIG. 4 is "localhost:54321", and thus the procedure advances from step S507 to step S511. The TCP packet 405 is transmitted to the HTTP server via the local network by the USB-TCP conversion module 202 running on the same MFP 100 as the HTTP server 201. Therefore, the address of the client that has connected to the HTTP server 201 is a local loop-back address. Therefore, the procedure moves from step S512 to step S508, where HTTP processing is performed even if the port number of the host header value is different from the number of the port at which the HTTP server 201 runs. Note that a loop-back address is designated as the sender address of the packet that is received by the HTTP server 201 from the virtual server 206.

With the above-described configuration and procedure, the image forming apparatus according to the present embodiment determines whether or not a message such as an HTTP request that is received from a PC or the like, which serves as a host device, in accordance with the IPP over USB protocol is a message complying with the IPP over USB protocol based on destination and sender information that are included in the protocol header. It is thus possible to process the message appropriately without unnecessary error occurring.

Note that the determinations of steps S506, S507, S511, and S512 of FIG. 5 are not necessarily performed in this order. A first case in which the request is determined as a normal HTTP request is a case where the host name of the host header indicates an MFP or a local host (or a loop-back address) and the port number indicates the HTTP server. This case corresponds to a request to the HTTP server, for example, via the LAN or within the device. The local host and the loop-back address have the same meaning in that they indicate the local device itself. A second case is a case where the host name of the host header indicates a local host (or a loop-back address), and the sender address of the TCP packet also shows a loop-back address. This indicates that the first transmission is performed within the client device, and it can be determined that it is a request transmitted by IPP over USB that uses the virtual server. The determinations of the items may be performed in any order as long as they are used in a method for determining both requests of the first and second cases as acceptable HTTP requests.

Second Embodiment

Figure 7:
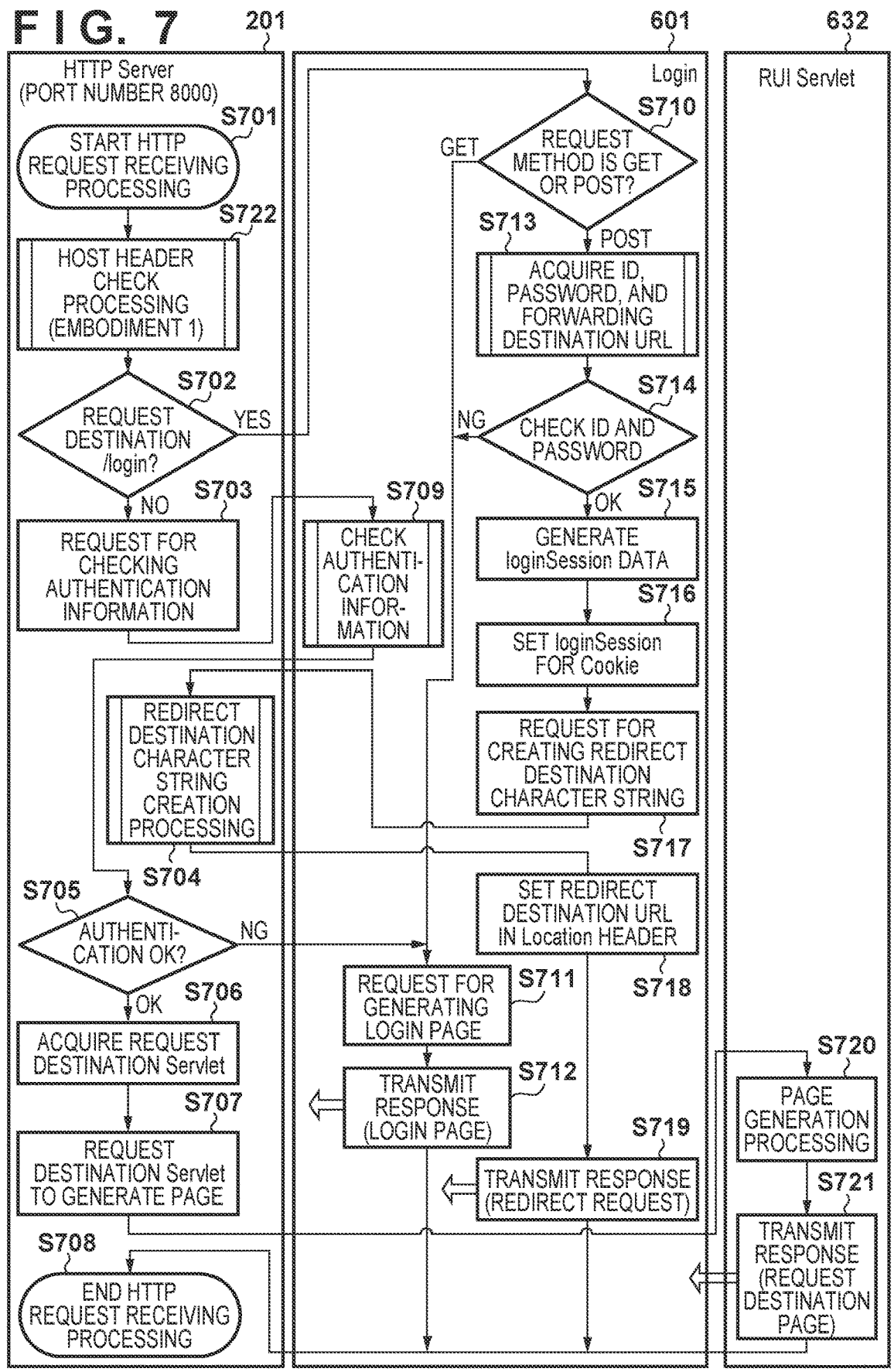
FIG. 7 is a flowchart of processing of the second embodiment.

A second embodiment is executed on the premise of the first embodiment. FIG. 7 is a flowchart of processing of the HTTP server 201 that has received an HTTP request, a login 601 that performs user authentication, and a RUI servlet 632 that provides a remote UI, according to the present embodiment. Here, the login 601 is a module for performing authentication information check, login page creation, and login request processing, and is referred to also as "login" or "login module".

Upon receiving an HTTP request, the HTTP receiving unit 303 of the HTTP server 201 starts HTTP request receiving processing (step S701). The HTTP receiving unit 303 performs the host header check of the first embodiment (step S722). The content of step S722 corresponds to steps S502 to S507, and steps S511 to S514 of the procedure of FIG. 5. Steps S508 and S509, which are processing in response to the request, correspond to the processing that is executed from step S702 of FIG. 7 onward. Here, in this flowchart, it is assumed that in step S701, the host header check is successful. If the host header check is unsuccessful, an error response is given in steps S513 and S514.

The HTTP receiving unit 303 checks whether or not the request URL stored in the request 311 of the HTTP request 309 is "/login", which is a URL for requesting the login 601 to perform authentication (step S702). If the request URL is "/login", the procedure moves to step S710. If the request URL is not "/login", the procedure moves to step S703.

In step S703, the HTTP receiving unit 303 requests the login 601 to perform authentication check. In response to this, the login 601 performs authentication information check processing, and transmits the information indicating the processing result back to the HTTP receiving unit 303 (step S709). The details of step S709 will be described with reference to FIG. 8.

In step S705, the HTTP receiving unit 303 checks the authentication information check processing result received from the login 601 (step S705). If the authentication is successful, that is, the user who made the request is the login user, the procedure moves to step S706. If the authentication is unsuccessful, that is, the user who made the request is not the login user, the login 601 is requested to perform authentication response processing (steps S711 and S712). In step S711, the login 601 generates a login page 1001 (see FIG. 10) for performing login, and transmits the login page generated in step S711 as a response to the client (step S712).

Figure 10:
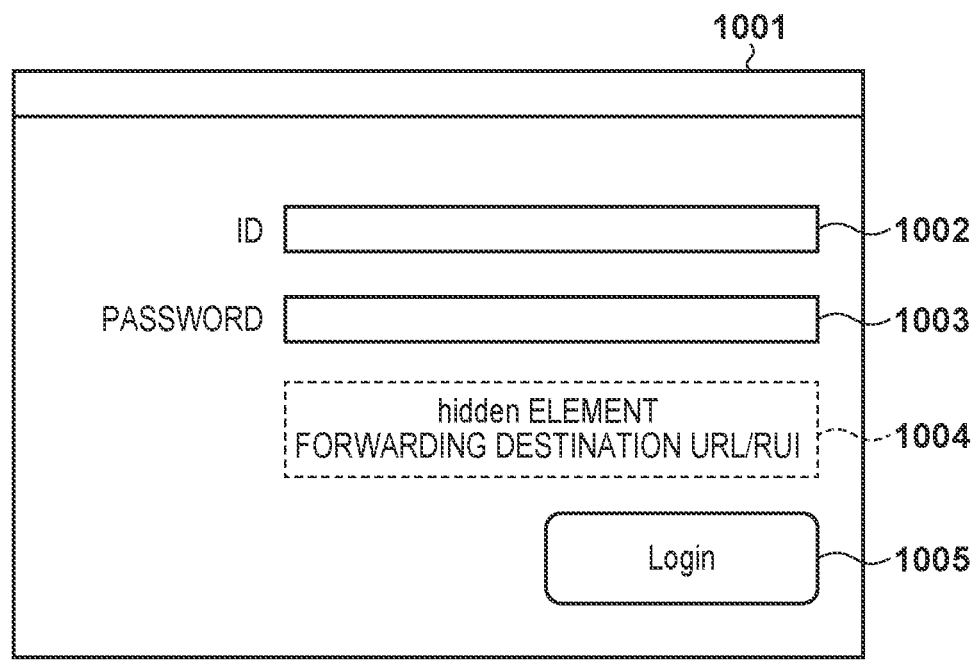
FIG. 10 is a diagram illustrating a login page of the second embodiment.

As shown in FIG. 10, the login page 1001 includes an ID input field 1002, a password input field 1003, forwarding destination URL information 1004 to be displayed after login, and a login button 1005 for transmitting a login request to a server. The forwarding destination URL information 1004 is described in HTML as a hidden element in an HTML format. When the user performs login operation, a POST request having a request body that includes the input ID, the input password, and the forwarding destination URL information 1004 to be displayed after login is transmitted to the HTTP server 201. The login page 1001 is an example in which authentication is performed using an ID and a password as the authentication information. Items except for the forwarding destination URL information 1004 to be displayed after login may be changed depending on the authentication type.

If the authentication is successful, in step S706, the HTTP receiving unit 303 acquires a servlet from the servlet searching unit 323 using the request URL of the HTTP request as a key (step S706). Then, the servlet acquired in step S706 is requested to perform page generation (step S707). In the example of FIG. 7, the servlet designated by the request URL is assumed to be included in a remote UI servlet 632.

After being requested to perform page generation, the RUI servlet 632 generates an HTML page of a remote UI (step S720). Then, the page of the remote UI generated for the client in step S720 is transmitted back to the client as a response (step S721), and the HTTP request receiving processing ends (step S708).

On the other hand, the login 601 checks in step S710 whether the request method of the HTTP request is GET or POST (step S710). If the request method is GET, the procedure moves to step S711, where a login page is generated. If the request method is POST, the procedure moves to step S713. In step S713, the login 601 analyzes the request body of the POST request, and acquires ID, a password, and a forwarding destination URL (step S713). The forwarding destination URL is a forwarding destination URL/RUI 1004 that is set and included in advance in the login UI 1001. Then, the login 601 perform authentication using the ID and the password that are acquired in step S713 (step S714). If the authentication is successful, the procedure moves to step S715. If the authentication is unsuccessful, the procedure moves to step S711, where a login page is generated.

In step S715, the login 601 generates loginSession data, which indicates that the user has logged in (step S715). Furthermore, the loginSession data generated in step S715 is set as a response header "Set-Cookie" in a response header 318 of the HTTP response 310 (step S716). Furthermore, the generated loginSession data is stored by the login 601 as data for specifying the currently maintained session. Even when there is a plurality of sessions at the same time, loginSession data is generated, is transmitted as a response, and is stored for each session. The response header is header information that is to be transmitted as response data to the client. Then, the login 601 requests the redirect destination URL character string creation unit 322 of the HTTP server 201 to create a character string of the redirect destination URL using the forwarding destination URL acquired in step S713 as an argument (step S717). The redirect destination URL character string creation unit 322 of the HTTP server 201 that is requested by the login 601 to create a character string of the redirect destination URL creates the redirect destination character string (step S704), and transmits it back to the login 601. The details of step S704 will be described with reference to FIG. 11.

The login 601 sets the redirect destination character string created by the redirect destination URL character string creation unit 322 as a response header location in the response header 318 of the HTTP response 310 (step S718). Then, the login 601 transmits a redirect response to request the client to perform redirecting (step S719). The Set-Cookie header in which the loginSession data is set, the location header, and information on another response header that are stored in that response header 318 are also transmitted to the client. Here, the loginSession data that is transmitted as a cookie to the client is information for specifying a session. The login session data is issued in response to the login of a user, and is included as a cookie header until the user logs out.

Authentication Information Check

Figure 8:
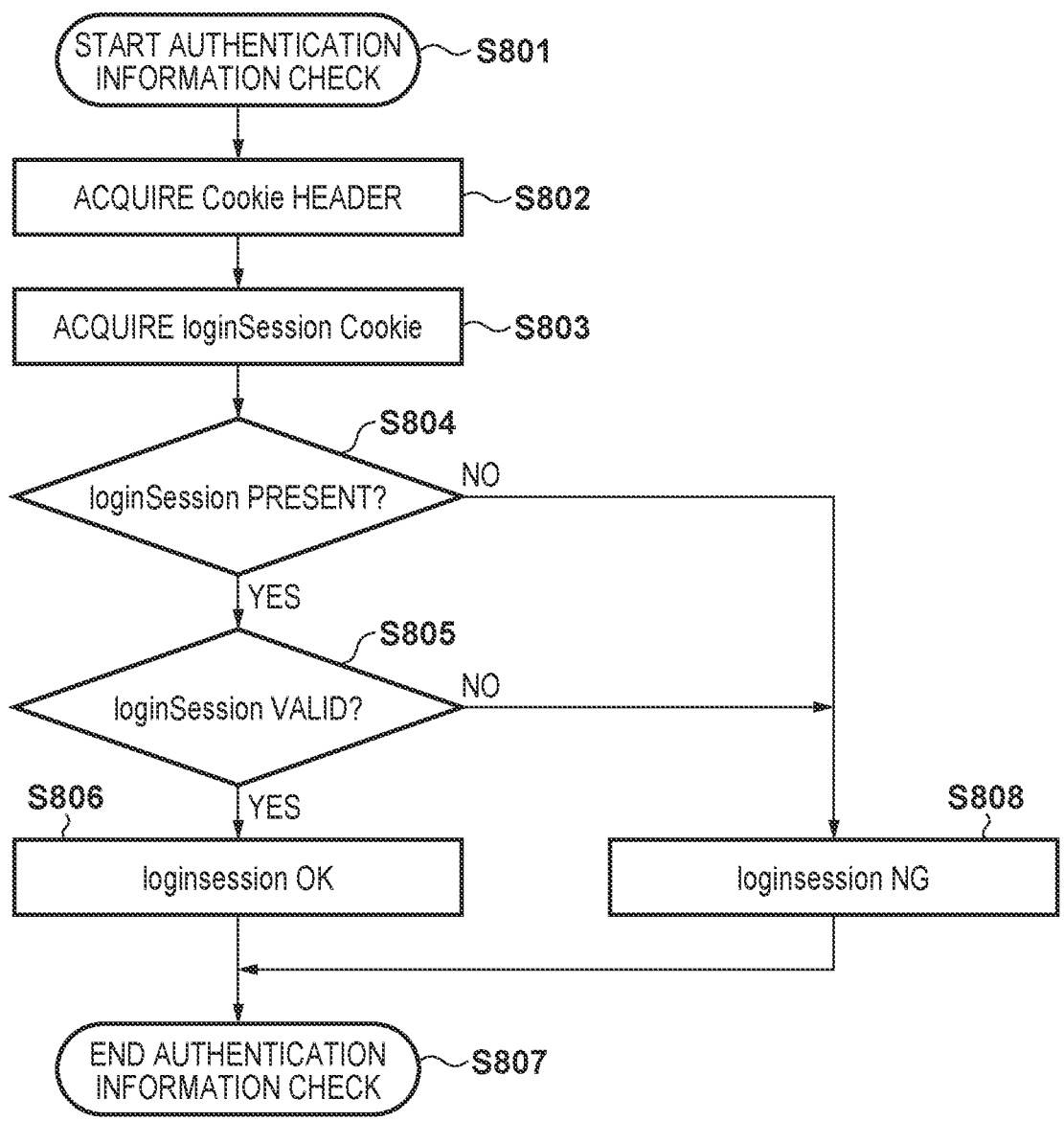
FIG. 8 is a flowchart of authentication information check processing of the second embodiment.

FIG. 8 is a flowchart of authentication information check (step S709) that is executed by the login 601. In accordance with a request from the HTTP server 201, the login 601 starts the authentication information check (step S801). The login 601 acquires a cookie header value from the request header table 312 of the HTTP request 309 of the HTTP connection 305 (step S802). The login 601 attempts to acquire the value of loginSession, which is an authentication identifier, from the cookie header (step S803).

The login 601 checks whether the loginSession was acquired in step S803 (step S804). If the loginSession was not acquired, the login 601 regards the state as a non-logged-in state and moves the procedure to step S808 to transmit a check result indicating that the authentication information check is failed as a response to the HTTP server 201 (step S808), and ends the authentication information check processing (step S807). If the loginSession was acquired, the procedure moves to step S805. The login 601 checks, that is, determines whether or not the loginSession acquired in step S803 is a valid authentication identifier (step S805).

If the loginSession is valid, the login 601 transmits a check result indicating that the authentication information check is successful back to the HTTP server 201 (step S806), and ends the authentication information check processing (step S807). If the loginSession is invalid, the login 601 transmits the check result indicating that the authentication information check is failed back to the HTTP server 201 (step S808), and ends the authentication information check processing (step S807). The valid loginSession corresponds to, for example, a loginSession stored in the login 601 as information for specifying the current session.

Redirect Destination URL Character String Creation Processing

Figure 11:
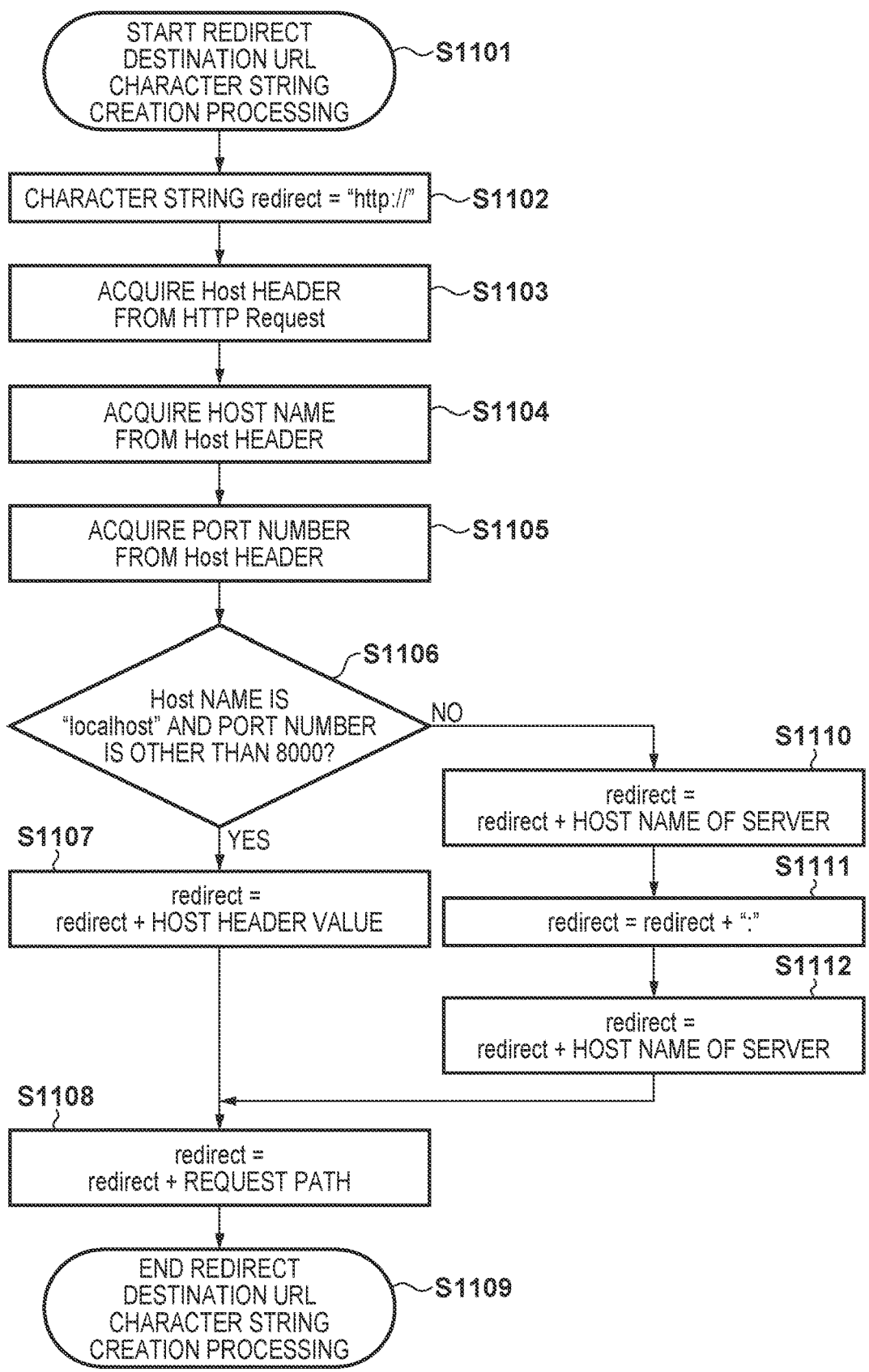
FIG. 11 is a flowchart of redirect destination character string creation processing according to the second embodiment.

FIG. 11 is a flowchart of the redirect destination URL character string creation processing performed by the redirect destination URL character string creation unit 322 of the HTTP server 201 (step S704). The redirect destination URL character string creation unit 322 starts the redirect destination URL character string creation processing (step S1101). At this time, the forwarding destination URL acquired in step S713 is given as an argument. The redirect destination URL character string creation unit 322 substitutes "http://" into the character string "redirect" (step S1102). The redirect destination URL character string creation unit 322 acquires host header information stored in the request header table 312 of the HTTP request 309 of the HTTP connection 305 (step S1103). The redirect destination URL character string creation unit 322 acquires a host name from the host header information acquired in step S1103 (step S1104). Furthermore, a port number is acquired (step S1105).

Then, the redirect destination URL character string creation unit 322 checks the host name acquired in step S1103 and the port number acquired in step S1104 (step S1106). In step S1106, it is determined whether or not the acquired host name is "localhost" and the acquired port number is a number (for example, 54321) other than the number of the port at which the HTTP server 201 runs. If so, the procedure moves to step S1107. Otherwise, the procedure moves to step S1110. In step S1107, the redirect destination URL character string creation unit 322 adds the host header value to the character string "redirect" (step S1107). For example, in the case of a packet complying with IPP over USB, the host name of the host header is "localhost", and the port number is the same port number 54321 as that of the virtual server 206, and thus step S1107 is executed, and for example, the character string "redirect" is http://localhost: 54321 or the like.

Then, the redirect destination URL character string creation unit 322 adds the forwarding destination URL as a request path to the character string "redirect" (step S1108). Then, the redirect destination URL character string creation unit 322 ends the redirect destination URL character string creation processing (step S1109), and transmits the created character string "redirect" with the redirect destination URL back to the login 601.

On the other hand, if it is determined in step S1106 that the host name of the HTTP request is other than "localhost" or the port number is the port 8000 of the HTTP server, step S1110 is executed. In step S1110, the redirect destination URL character string creation unit 322 adds the host name acquired in step S1104 to the character string "redirect" (step S1110). Then, the redirect destination URL character string creation unit 322 adds ":" to the character string "redirect" (step S1111). Then, the redirect destination URL character string creation unit 322 adds the number of the port at which the HTTP server 201 is running to the character string "redirect" (step S1112), and moves the procedure to step S1108. In step S1112, for example, "http://host name:8000" is created as the character string "redirect". Accordingly, the redirect destination URL is created, and is transmitted back to the login 601.

Example of Sequence of Processing of Second Embodiment

Figure 6:
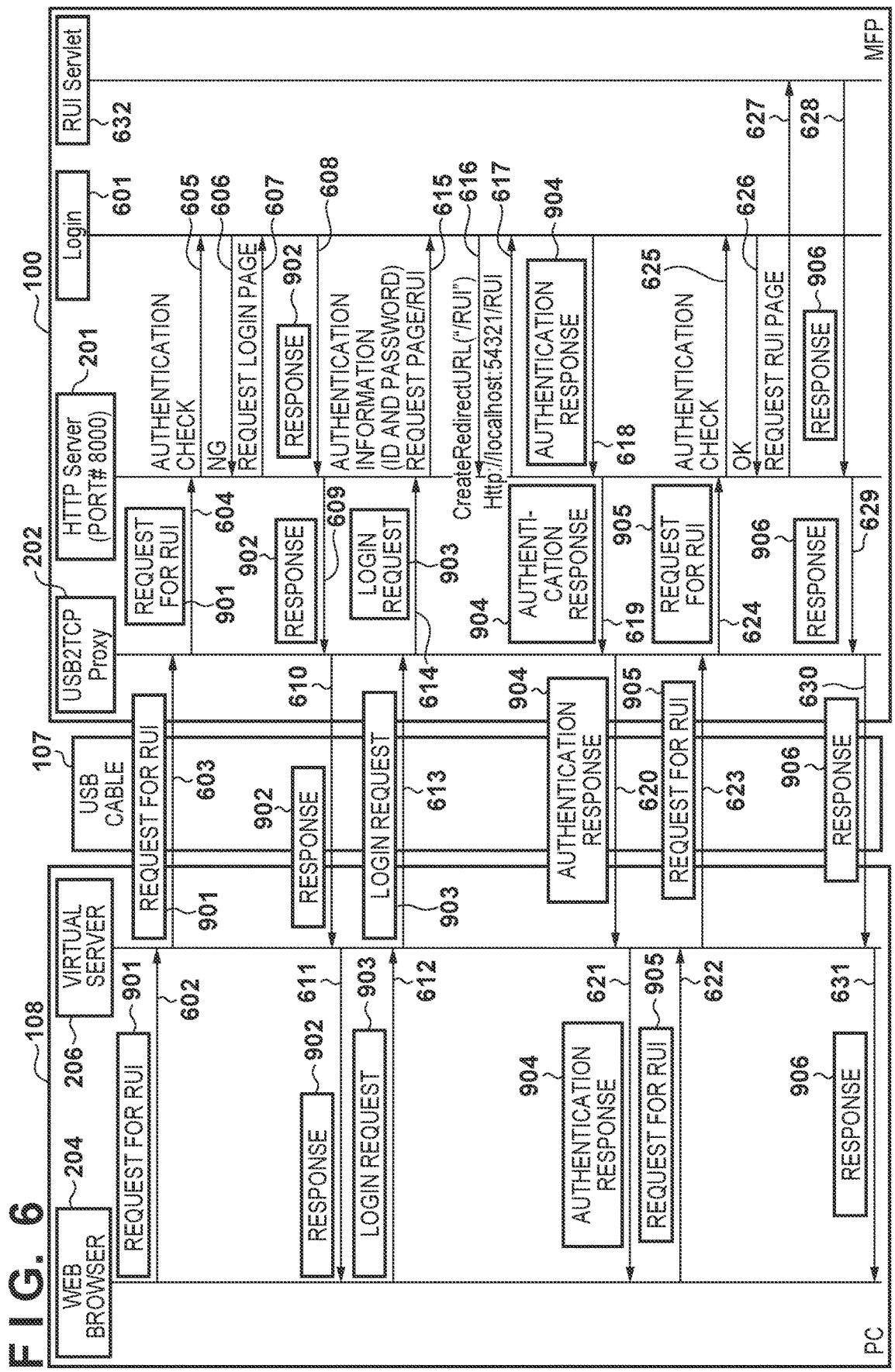
FIG. 6 is a sequence diagram of processing according to a second embodiment.
Figure 9A:
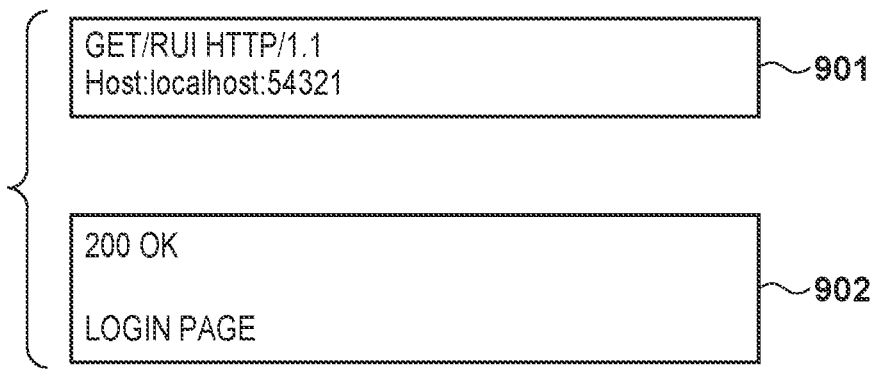
FIGS. 9A, 9B, and 9C are diagrams illustrating HTTP protocol data of the second embodiment.

FIG. 6 is a sequence diagram illustrating an example of the processing of the second embodiment. The web browser 204 transmits, to the virtual server 206, a request 901 for the remote UI (RUI) in order to set the MFP 100 (step S602). Here, an example of the request 901 is shown in FIG. 9A. The first line indicates that the request is an http GET request of HTTP/1.1 for an RUI, that is, a remote UI module, and the second line describes "localhost" as the host name of the host header and 54321 as the port number, indicating that the destination of the request is the virtual server 206.

After receiving the request 901, the virtual server 206 converts the request 901 for the remote UI that was received from the web browser 204 into a USB packet from TCP/IP, and transmits the converted USB packet to the USB-TCP conversion module 202 via the USB interface (step S603). The USB-TCP conversion module 202 reconverts the request 901 for the remote UI that was received from the virtual server 206 into a TCP/IP packet, and transmits the TCP/IP packet to the HTTP server 201 (step S604).

The HTTP server 201 requests the login 601 to perform authentication check (step S605). After being requested to perform authentication check, the login 601 performs the authentication check of step S709 (see FIG. 8). Since the request 901 does not have a Cookie header and cannot acquire "loginSession", step S808 of FIG. 8 is executed and a response indicating that the authentication check is failed is transmitted back from the login 601 (step S606). Therefore, the check of step S705 results in "failed", and the HTTP server 201 requests the login 601 to generate a login page (step S607).

The login 601 generates a login page as shown in FIG. 10 (step S608), and thus the HTTP server 201 transmits a response 902 back to the USB-TCP conversion module 202 (step S609). An example of the response 902 is also shown in FIG. 9A. The response 902 includes a code 200 OK indicating that the request was successful, and the generated login page. The USB-TCP conversion module 202 transmits the response 902 back to the virtual server 206 (step S610). The virtual server 206 transmits the response 902 back to the web browser 204 (step S611).

Figure 9B:
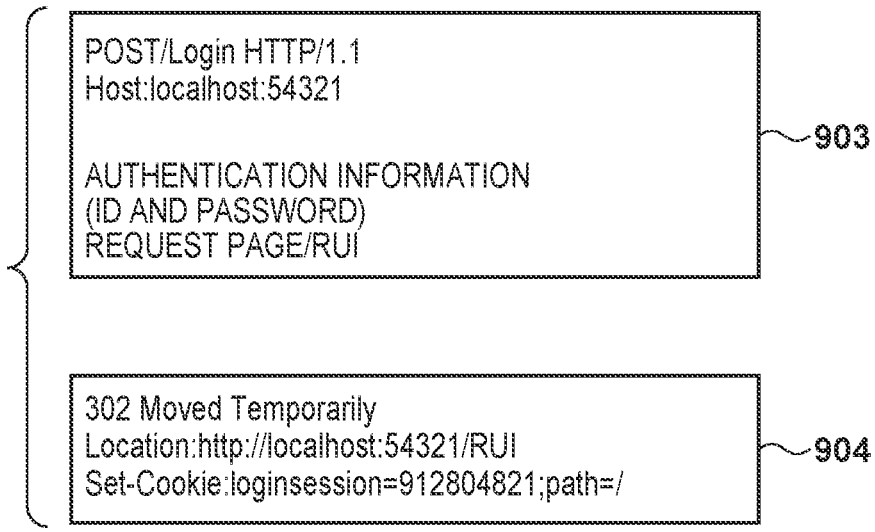

The login page transmitted as the response to the client 108 is displayed by the web browser 204. When a user inputs an ID and a password and presses a login button on the login page 1001, the web browser 204 transmits a login request 903 to the virtual server 206 (step S612). An example of the login request 903 is also shown in FIG. 9B. The login request 903 indicates that the request is "Post", the request destination is the login 601, and the request has the http version 1.1, and has the host name "localhost" and the port number "54321", as the host header. Furthermore, the ID and the password, which are input authentication information, and a request path are shown. In FIG. 9B, as the request path, "requested page/RUI", that is, a request for an RUI, and the requested page are shown.

The virtual server 206 transmits the login request 903 received from the web browser 204 to the USB-TCP conversion module 202 (step S613). The USB-TCP conversion module 202 transmits the login request 903 received from the virtual server 206 to the HTTP server 201 (step S614).

When the HTTP server 201 that has received the login request 903 performs the login request check (step S702), the request URL is "/login", and thus the HTTP server 201 requests the login 601 to perform authentication processing (step S615). The login 601 first checks the request method in step S710, and since the request method of the login request 903 is "POST", the login 601 executes the authentication processing in steps S713 to S716 of FIG. 7. Furthermore, the login 601 requests the HTTP server 201 to perform redirect destination URL character string creation processing (step S704 of FIG. 7) (step S616). At this time, as a parameter, "/RUI", which is a part of the request path described in the request 903, is transmitted together with the request.

In the URL character string creation processing, the parameter "/RUI" is added to the host header value "localhost:54321" to create a redirect destination URL character string "http://localhost:54321/RUI", and then the created redirect destination URL character string is transmitted back to the login 601 (step S617). When the redirect destination URL character string is transmitted back from the HTTP server 201, the login 601 sets the redirect destination URL character string in the location header (step S718). Furthermore, the login 601 transmits an authentication response 904 back to the HTTP server 201 (step S618). An example of the authentication response 904 is also shown in FIG. 9B. The authentication response 904 has, as an HTTP status code, a code 302 (Moved Temporarily) indicating that the requested resource is temporarily moved, and includes a redirect destination URL character string created as a URL at which the requested resource is present. Furthermore, "loginSession" for uniquely specifying a session is set as "Set-Cookie".

The HTTP server 201 transmits the authentication response 904 back to the USB-TCP conversion module 202 (step S619). The USB-TCP conversion module 202 transmits the authentication response 904 back to the virtual server 206 (step S620). The virtual server 206 transmits the authentication response 904 back to the web browser 204 (step S621).

Figure 12:
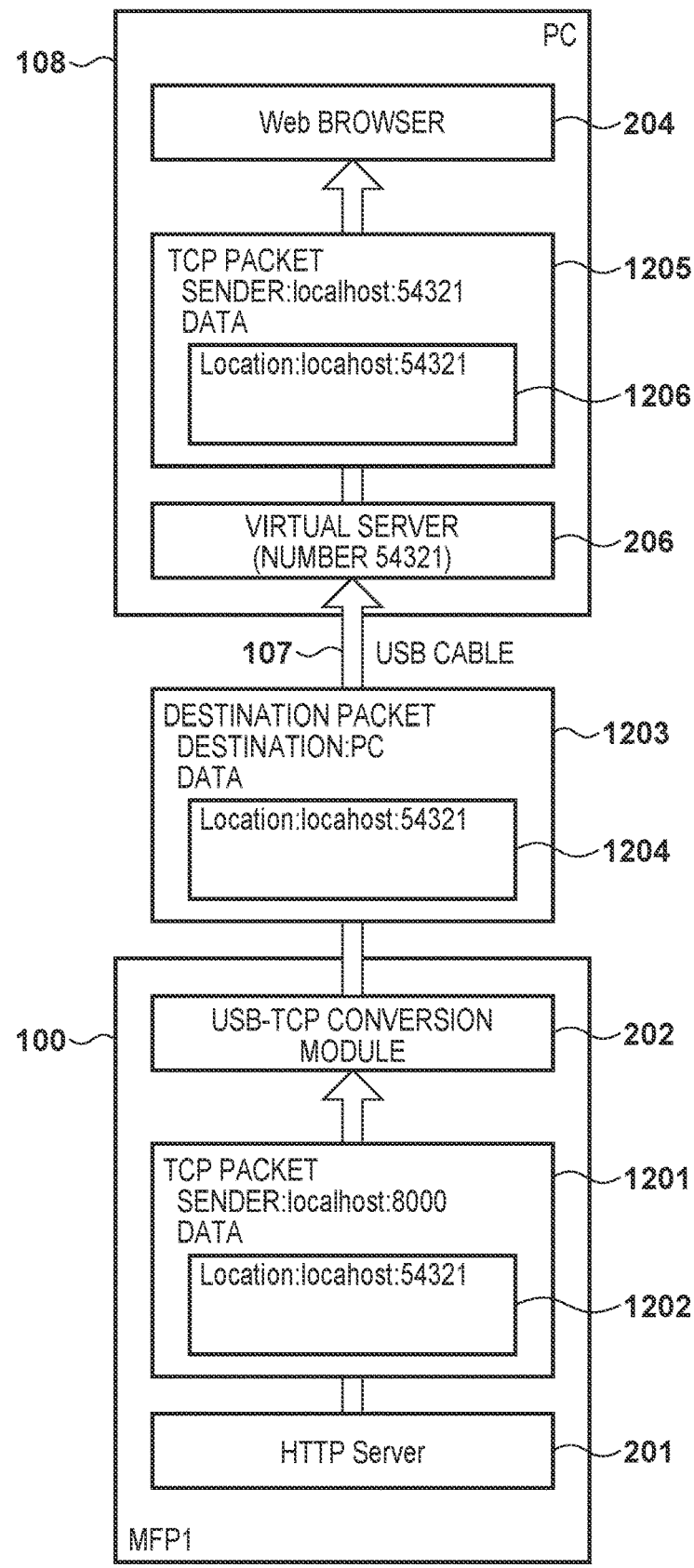
FIG. 12 is a diagram illustrating data to be transmitted from the HTTP server to the web browser, according to the second embodiment.

FIG. 12 is a diagram illustrating packets that are transmitted from the HTTP server 201 to the web browser 204 in the sequence of steps S619 to S621. In step S619, a TCP packet 1201 of the authentication response 904 is transmitted from the HTTP server 201 to the USB-TCP conversion module 202. Data 1202 included in this TCP packet 1201 includes the HTTP response header "Location: http://localhost:54321/RUI".

The TCP packet 1201 is converted into a USB packet 1203 by the USB-TCP conversion module 202, and is transmitted to the virtual server 206. Data 1204 of the USB packet 1203 includes the HTTP response header "Location: http://localhost:54321/RUI".

Figure 9C:
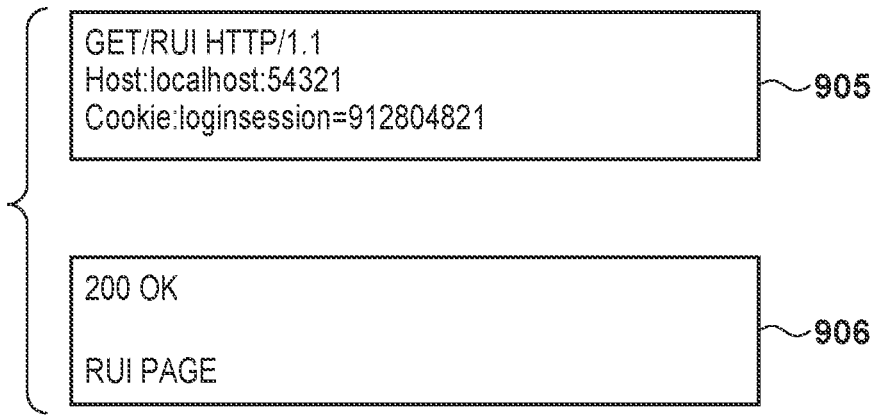

The USB packet 1203 is converted into a TCP packet 1205 by the USB-TCP conversion module 202, and transmitted to the web browser 204. Data 1206 included in the TCP packet 1205 includes the HTTP response header "Location: http://localhost:54321/RUI". The authentication response 904 has the status 302, the location header "http://localhost:54321/RUI", and the Set-Cookie header "loginSession=912804821; path=/". Accordingly, the web browser 204 automatically transmits a request 905 for the remote UI to the virtual server 206 running at the port 54321 of the same PC 108 (step S622). Furthermore, the web browser 204 adds the Cookie header "loginSession=912804821" set in the Set-Cookie header of the authentication response 904 to the request 905 for the remote UI, as shown in FIG. 9C.

The virtual server 206 transmits the request 905 for the remote UI received from the web browser 204 to the USB-TCP conversion module 202 (step S623). The USB-TCP conversion module 202 transmits the request 905 for the remote UI received from the virtual server 206 to the HTTP server 201 (step S624).

The HTTP server 201 requests the login 601 to perform authentication check (step S625). After being requested to perform authentication check, the login 601 performs the authentication check of step S709. The request 905 has the Cookie header "loginSession=912804821", and thus after the check of step S804, the procedure moves to step S805. This login session is valid, and thus the procedure moves to step S806, where the login 601 transmits a response indicating that the authentication check is successful back to the HTTP server 201 (step S626).

Since a response indicating that the authentication check is "successful" is transmitted from the login 601, the HTTP server 201 advances to step S706, and acquires a servlet from the servlet searching unit 323 using the request URL "/RUI" as a key (step S706 of FIG. 7). Then, the RUI servlet 632 acquired in step S706 is requested to generate a RUI page (steps S707 of FIG. 7 and S627).

The RUI servlet 632 generates a RUI page (step S720 of FIG. 7), and transmits a RUI response 906 (step S628). The RUI response includes the requested RUI page. The HTTP server 201 transmits the RUI response 906 back to the USB-TCP conversion module 202 (step S629). The USB-TCP conversion module 202 transmits the RUI response 906 back to the virtual server 206 (step S630). The Virtual server 206 transmits the RUI response 906 back to the web browser 204 (step S631).

With this sequence, the web browser 204 receives the RUI response 906, and displays a remote UI screen. Thereinafter, the setting operation of the MFP 100 using the remote UI is executed similarly to the sequence of S622 to S631.

In the above-described manner, in response to a login request, the image forming apparatus 100 transmits a response for redirecting to a URL by which the virtual server 206 is designated to the web browser 204, and thereby the web browser 204 can transmit a request to the virtual server after login.

Third Embodiment

Figure 14:
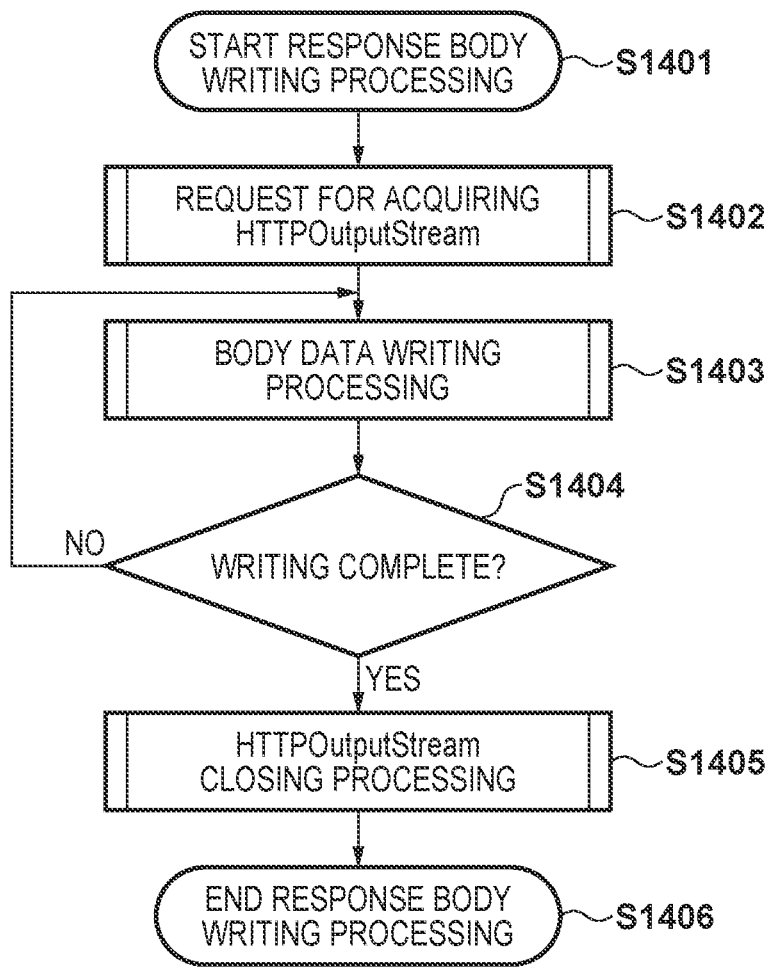
FIG. 14 is a flowchart of response body writing processing of the third embodiment.

The third embodiment is executed on the premise of the first and second embodiments. FIG. 14 is a flowchart of response body data writing processing by the servlet 321. The servlet 321 starts the response body data writing processing (step S1401). Note that in the present embodiment, a description is given assuming that an HTTP response is not simple response data but an object. Accordingly, for example, FIGS. 14, 15, and the like illustrate as if the HTTP response performs processing as an executing subject. This is realization of a method defined in the HTTP response object, but it may be understood that, for example, the executing subject is the servlet 321 and the HTTP response is generated by the procedure called on by the servlet 321.

In FIG. 14, the servlet 321 first acquires the HTTP output stream 320 from the HTTP response 310 (step S1402). The servlet 321 writes body data generated by a logic unique to the servlet 321 in the HTTP output stream 320 acquired in step S1402 (step S1403). Furthermore, the servlet 321 determines whether or not the writing of all of the body data to be written by the servlet 321 is complete (step S1404). If the writing is not complete, the procedure moves to step S1403, and the writing is continued. If the writing is complete, the procedure moves to step S1405. After the completion of the writing of the body data, the servlet 321 performs processing for closing the HTTP output stream 320 (step S1405), and ends the response body data writing processing (step S1406).

Figure 15:
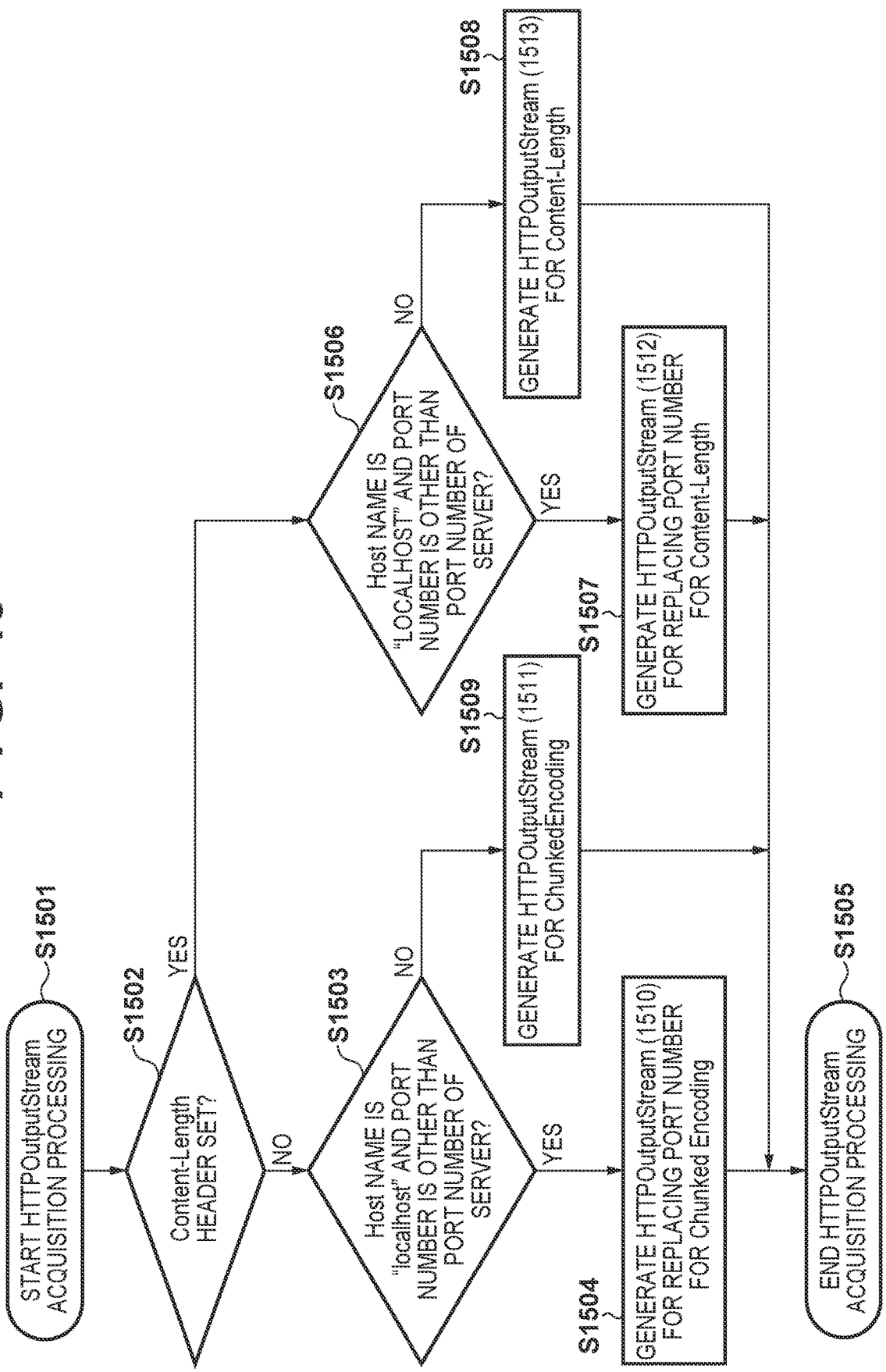
FIG. 15 is a flowchart of HTTP output stream acquisition request processing according to the third embodiment.

FIG. 15 is a detailed flowchart of the processing for acquiring the HTTP output stream 320 in step S1402. Here, the HTTP response described as the executing subject can execute the method since it is not simple response data but an object as described above. Accordingly, the HTTP response may be regarded as a single program module.

Upon receiving a request for acquiring the HTTP output stream 320 from the servlet 321, the HTTP response 310 starts the processing for acquiring the HTTP output stream 320 (step S1501). The HTTP response 310 checks whether or not a Content-Length header is set in a response header table 317 (step S1502). If the Content-Length header is not set, the procedure moves to step S1503 in order to transmit the body data by chunked encoding. If the Content-Length header is set, the procedure moves to step S1506 in order to manage a transmission data size using Content-Length header information. Note that "chunked encoding" is an encoding method in which body data, that is, data to be transmitted, is divided into chunks of a suitable size, and headers describing the respective chunk sizes are added.

The HTTP response 310 acquires the host header information stored in the request header table 312 of the HTTP request 309. Furthermore, it is checked whether or not the host name is "localhost" and the port number is a number other than the port number (for example, 8000) of the port at which the HTTP server 201 runs (step S1503). If the determination result in step S1503 is "YES", that is, the host name is "localhost" and the port number is a number other than the number of the port at which the HTTP server 201 runs, the procedure moves to step S1504. Otherwise, the procedure moves to step S1509.

In step S1504, the HTTP response 310 generates an HTTP output stream 1510 that transmits the body data by chunked encoding and replaces the port number. Then, the generated HTTP output stream 1510 is transmitted back to the servlet 321. Then, the processing for acquiring the HTTP output stream 320 ends (step S1505).

In step S1509, the HTTP response 310 generates an HTTP output stream 1511 that transmits the body data by chunked encoding, and transmits it back to the servlet 321. Then, the processing for acquiring the HTTP output stream 320 ends (step S1505).

In step S1506, the HTTP response 310 acquires the host header information stored in the request header table 312 of the HTTP request 309. Then, it is checked whether or not the host name is "localhost" and the port number is a number other than the number of the port at which the HTTP server 201 runs (step S1506). If the determination result of step S1506 is "YES", that is, the host name is "localhost" and the port number is a number other than the number of the port at which the HTTP server 201 runs, the procedure moves to step S1507, and otherwise to step S1508.

In step S1507, the HTTP response 310 generates an HTTP output stream 1512 that transmits the body data using the Content-Length header and replaces the port number. Then, the generated HTTP output stream 1512 is transmitted back to the servlet 321 (step S1507). Then, the processing for acquiring the HTTP output stream 320 ends (step S1505).

In step S1508, the HTTP response 310 generates an HTTP output stream 1513 that transmits the body data using the Content-Length header, and transmits it back to the servlet 321 (step S1508). Then, the processing for acquiring the HTTP output stream 320 ends (step S1505).

Figure 16:
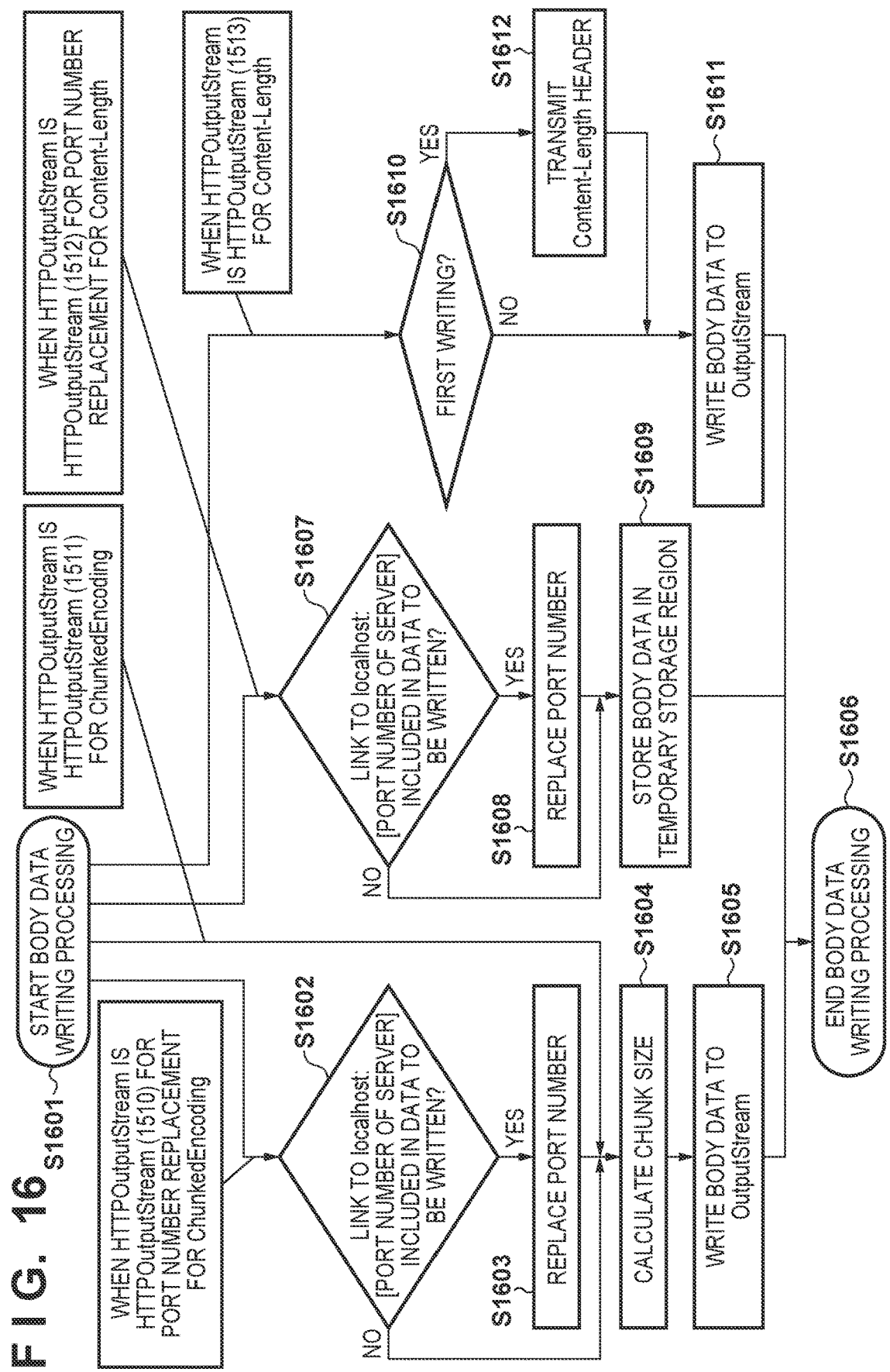
FIG. 16 is a flowchart of body data writing processing of the third embodiment.

FIG. 16 is a detailed flowchart of the processing for writing the body data to the HTTP output stream 320 in step S1403. When the body data is attempt to be written in the HTTP output stream 320 from the servlet 321, the body data writing processing starts (step S1601). The subject of the processing on the software is the HTTP output stream 320, and similar to the output stream, the processing is realized by execution of the method defined in an HTTP output stream object, for example.

If the HTTP output stream 320 is the HTTP output stream 1510 that transmits the body data by chunked encoding and replaces the port number, the processing is performed starting from step S1602.

In step S1602, the HTTP output stream 320 checks link information included in the data written from the servlet 321. If the data includes the link information indicating that the host name is "localhost" and the port number is the number of the port at which the HTTP server 201 runs, the procedure moves to step S1603. If the data does not include such link information, the procedure moves to step S1604. In step S1603, the HTTP output stream 320 replaces the port number with the port number (that is, a number other than the port number of the server) described in the host header stored in the request header table 312 (step S1603). In step S1604, the HTTP output stream 320 measures the length of the data, and determines the chunk size (step S1604). Note that the entities of the response data to the client that is written by the servlet 321 of the RUI include the link with (reference to) the host name and the port number that are to be presented to the client.

In step S1605, the HTTP output stream 320 writes the chunk size calculated in step S1604 and the data to the output stream 308, and ends the body data writing processing (step S1606).

If the HTTP output stream 320 is the HTTP output stream 1511 that transmits the body data by chunked encoding, the processing is performed starting from step S1604. If the HTTP output stream 320 is the HTTP output stream 1512 that transmits the body data using the Content-Length header and replaces the port number, the processing is performed starting from step S1607.

In step S1607, the HTTP output stream 320 checks whether or not the data written from the servlet 321 includes the link with "localhost" and the number of the port at which the HTTP server 201 runs (step S1607). If the data includes the link, the procedure moves to step S1608. If the data does not include the link, the procedure moves to step S1609. In step S1608, the HTTP output stream 320 replaces the port number by the port number described in the host header stored in the request header table 312 (step S1608). In step S1609, the HTTP output stream 320 stores the data in a temporary storage region (step S1609), and ends the body data writing processing (step S1606).

If the HTTP output stream 320 is the HTTP output stream 1513 that transmits the body data using the Content-Length header, the processing is performed starting from step S1610. In step S1610, the HTTP output stream 320 determines whether or not the writing is the first writing from the servlet 321 (step S1610). If it is the first writing, the procedure moves to step S1612. If the writing is not the first writing, the procedure moves to step S1611. In step S1612, the HTTP output stream 320 writes the Content-Length header information stored in the response header table 317 to the output stream 308 (step S1612). Then, the procedure moves to step S1611. The Content-Length header information is calculated by the servlet 321 before the servlet 321 starts the response body data writing processing, and stored in the response header table 317. In step S1611, the HTTP output stream 320 writes the data to the output stream 308, and ends the body data writing processing (step S1606).

Figure 17:
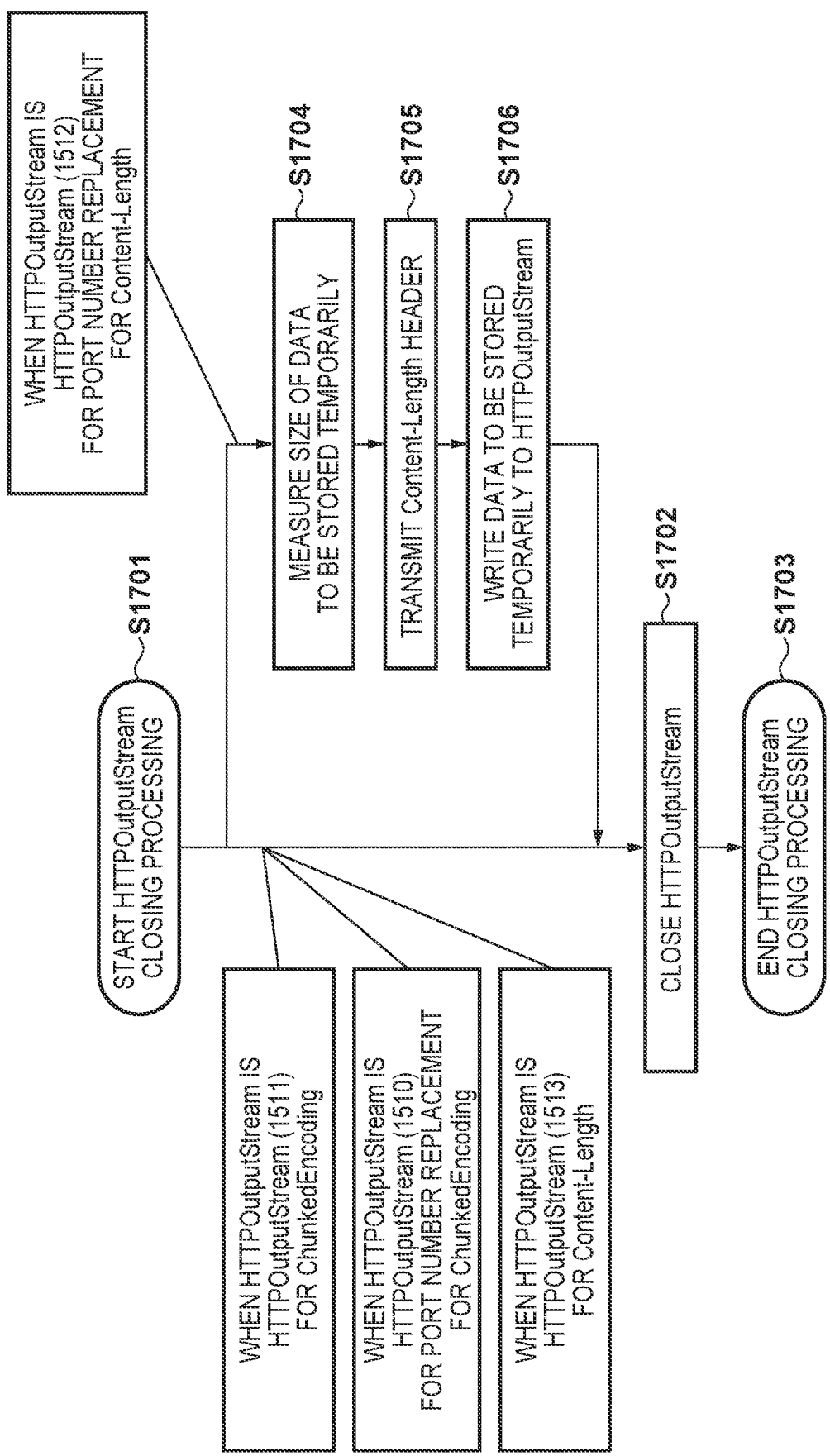
FIG. 17 is a flowchart of HTTP output stream closing processing of the third embodiment.

FIG. 17 is a detailed flowchart of the processing for closing the HTTP output stream 320 in step S1405. When the servlet 321 attempts to close the HTTP output stream 320, the closing processing starts (step S1701).

If the HTTP output stream 320 is the HTTP output stream 1510, 1511, or 1513, the processing is performed starting from step S1702. In step S1702, the HTTP output stream 320 performs closing processing (step S1702), and ends the processing for closing the HTTP output stream 320 (step S1703).

On the other hand, if the HTTP output stream 320 is the HTTP output stream 1512 that transmits the body data using the Content-Length header and replaces the port number, the processing is performed starting from step S1704. In step S1704, the HTTP output stream 320 measures the size of the data (data length) stored in the temporary storage region in which the data is temporarily stored in step S1609 (step S1704). Then, the size of the data acquired in step S1704 is written as the Content-Length header value in the output stream 308 (step S1705). Furthermore, the HTTP output stream 320 writes the data stored in the temporary storage region in which the data is temporarily stored in step S1609 in the output stream 308 (step S1706), and moves the procedure to step S1702.

With the above-described procedure, it is possible to pass the HTTP response data from the servlet 321 to the HTTP server via the output stream. At this time, it is determined whether or not the object to be processed is the packet complying with IPP over USB based on the host name and the port number included in the host header of the HTTP request, and if it is determined that the object to be processed is the packet complying with IPP over USB, the link included in the HTTP response data is changed to the port number of the virtual server.

Figure 13:
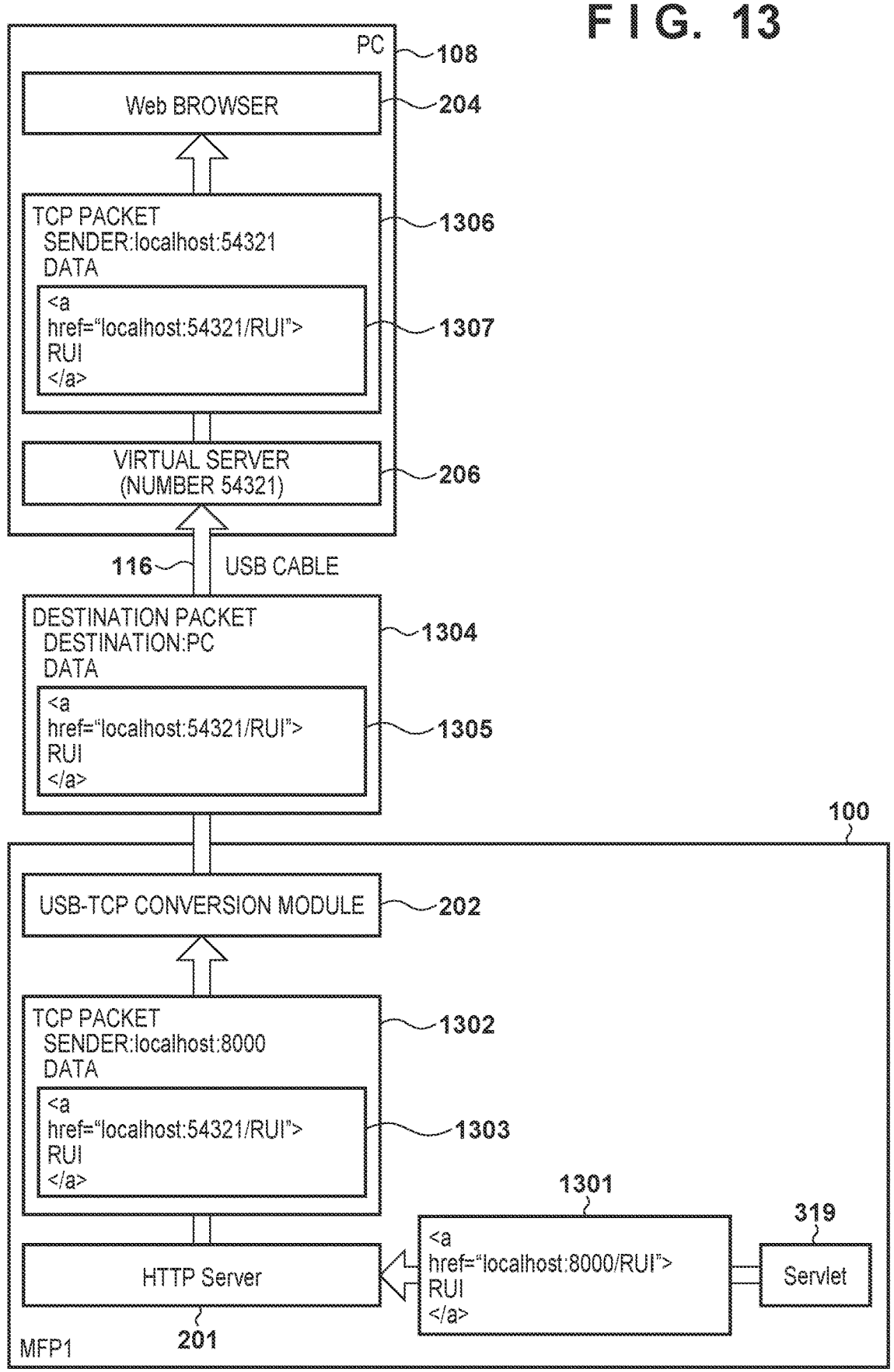
FIG. 13 is a diagram illustrating data to be transmitted from a servlet to the web browser, according to a third embodiment.

FIG. 13 is a diagram illustrating a change in data when the body data generated by the servlet 321 is transmitted to the web browser 204. As body data of the response, the servlet 321 writes data 1301 including a host name and a port number, for example, "localhost:8000". If the host header of the request includes "localhost" and a port number other than the number of the port at which the HTTP server 201 runs, the HTTP output stream 1510 or 1512 is used. Accordingly, the port number changing processing (steps S1603 and S1608) is executed, and data included in a packet 1302 that is to be transmitted to the USB-TCP conversion module 202 by the HTTP server 201 is changed to data 1303 whose port number is replaced with the port number written in the host header of the HTTP request.

The USB-TCP conversion module 202 extracts the data 1303 included in the TCP packet 1302, generates a USB packet 1304, and transmits the generated USB packet 1304 to the virtual server 206. The data 1303 included in the TCP packet 1302 and data 1305 included in the USB packet 1304 have the same port number.

After receiving the USB packet 1304, the virtual server 206 extracts the data 1305 from the USB packet 1304, generates a TCP packet 1306, and transmits the generated TCP packet 1306 to the web browser 204. The data 1305 included in the USB packet 1304 and data 1307 included in the TCP packet 1306 have the same port number.

After receiving the TCP packet 1306, the web browser 204 displays the data 1307 included in the TCP packet 1306 as a link. When a user clicks this link, a request is transmitted to the virtual server 206 running at the port 54321 of the PC 108, and the HTTP server 201 running on the MFP 100 is made available via the USB interface.

As described above, in the network system in which a host device and an image forming apparatus that is a USB device in which an HTTP server is installed are connected to each other using the IPP over USB protocol, it is possible to resolve a failure that may be caused by a virtual server performing mediation. Specifically, data transmission from the host device to the USB device was performed via the virtual server that is included in the host device and executes protocol conversion from HTTP to USB. Accordingly, mismatch occurred between the port number of the host included in the host header of an HTTP request and the port number of a TCP sender, causing an error in the HTTP server. This error is avoided by regarding the request as successful if the original destination of the HTTP request is the virtual server (first embodiment).

Furthermore, if a client performs redirecting using the USB device and a redirect destination is the HTTP server, redirecting can be performed via a virtual server using the IPP over USB protocol by designating a port of the virtual server, instead of the HTTP server (second embodiment).

Furthermore, if the entities of an HTTP response to the client include a link to the HTTP server, referencing can be performed via a virtual server using the IPP over USB protocol by designating a port of the virtual server, instead of the HTTP server (third embodiment).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-126872, filed Jun. 24, 2015 which is hereby incorporated by reference herein in its entirety.

What is claimed is:

1. An image forming apparatus comprising:
a converter; and
an HTTP server,
wherein the converter comprises;
a receiving unit configured to receive data from USB;
a change unit configured to change a destination of the received data into the HTTP server without changing a host name of the received data; and
a first transmission unit configured to transmit the received data to the HTTP server as an HTTP request;
wherein the HTTP server comprising:
a memory storing instructions; and
at least one processor that, upon execution of the stored instructions, functions as
a receiving unit that receives the HTTP request;
a first determination unit configured to determine whether or not the HTTP request is the HTTP request that has been transmitted to the image forming apparatus based on the host name of the HTTP request;
a second determination unit configured to determine whether or not a port number of the HTTP request is the same port number as a port number of the HTTP server;
a third determination unit configured to determine whether or not the HTTP request is the HTTP request that has been transmitted from the converter based on a source address of the HTTP request;
a processing unit configured to perform processing according to the HTTP request in a case where the HTTP request is determined by the first determination unit to be the HTTP request that has been transmitted to the image forming apparatus based on the host name of the HTTP request and the port number of the HTTP request is determined by the second determination unit to be the same port number as the port number of the HTTP server; and
a second transmission unit configured to transmit an error response for the HTTP request in a case where the HTTP request is determined by the first determination unit not to be the HTTP request that has been transmitted to the image forming apparatus based on the host name of the HTTP request,
wherein the processing unit is further configured to perform processing according to the HTTP request in a case where the HTTP request is determined by the third determination unit to be the HTTP request that has been transmitted from the converter based on a source address of the HTTP request even though the port number of the HTTP request is determined by the second determination unit not to be the same port number as the port number of the HTTP server; and
wherein the second transmission unit is further configured to transmit an error response for the HTTP request in a case where the port number of the HTTP request is determined by the second determination unit not to be the same port number as the port number of the HTTP server and the HTTP request is determined by the third determination unit not to be the HTTP request that has been transmitted from the converter based on a source address of the HTP request.

2. The image forming apparatus according to claim 1, wherein the at least one processor further functions as
a unit that, if the third determination unit determines that the HTTP request has been transmitted from the converter based on a source address of the HTTP request and the second determination unit determines that the port number in the HTTP request corresponds to a port number other than the port number of the HTTP server, creates a redirect destination character string in which the port number of the host header is set as a port number of the redirect destination,
wherein the second transmission unit gives an HTTP response that includes the redirect destination character string as a redirect destination.

3. The image forming apparatus according to claim 1, wherein if the third determination unit determines that the HTTP request has been transmitted from the converter based on a source address of the HTTP request and the second determination unit determines that the port number in the HTTP request corresponds to a port number other than the port number of the HTTP server, the port number included in link information included in response data to the client that accessed the HTTP server is converted into the port number of the HTTP request.

4. The image forming apparatus according to claim 3, wherein the second transmission unit further transmits, as data length information of the response data, a length of the data converted by the conversion of the port number.

5. The image forming apparatus according to claim 1, wherein
the at least one processor further functions as a fourth determination unit that determines if the HTTP request is a request transmitted via a proxy server, and, if so,
the processing unit performs processing in accordance with the HTTP request.

6. The image forming apparatus according to claim 5, wherein, if the image forming apparatus receives from the proxy server, via a USB interface, a USB packet that the proxy server formed by converting a TCP packet received from the client and rewriting a destination of the packet to the HTTP server of the image forming apparatus, then the processing unit converts the received USB packet into the TCP packet, rewrites a destination of the packet to the HTTP server of a local host, and forwards the packet.

7. The image forming apparatus according to claim 5, wherein the client and the image forming apparatus are connected to each other by an IPP over USB protocol.

8. A non-transitory computer-readable medium storing a program for controlling an image processing apparatus including an HTTP server and a converter that includes a receiving unit configured to receive data from USB; a change unit configured to change a destination of the received data into the HTTP server without changing a host name of the received data; and a transmission unit configured to transmit the received data to the HTTP server as an HTTP request, the program causing a computer in the image processing apparatus to perform a method comprising:
receiving an HTTP request;
determining whether or not the HTTP request is the HTTP request that has been transmitted to the image forming apparatus based on the host name of the HTTP request;
determining whether or not a port number of the HTTP request is the same port number as a port number of the HTTP server;
determining whether or not the HTTP request is the HTTP request that has been transmitted from the converter based on a source address of the HTTP request;
performing processing according to the HTTP request in a case where the HTTP request is determined to be the HTTP request that has been transmitted to the image forming apparatus based on the host name of the HTTP request and the port number of the HTTP request is determined to be the same port number as the port number of the HTTP server; and
transmitting an error response for the HTTP request in a case where the HTTP request is determined to be the HTTP request that has been transmitted to the image forming apparatus based on the host name of the HTTP request,
wherein the processing comprises performing processing according to the HTTP request in a case where the HTTP request is determined to be the HTTP request that has been transmitted from the converter based on a source address of the HTTP request even though the port number of the HTTP request is determined not to be the same port number as the port number of the HTTP server; and
wherein the transmitting comprises transmitting an error response for the HTTP request in a case where the port number of the HTTP request is determined not to be the same port number as the port number of the HTTP server and the HTTP request is determined not to be the HTTP request that has been transmitted from the converter based on a source address of the HTP request.

9. A method for controlling an HTTP server, the method comprising:
in an HTTP server included in an image forming apparatus having a converter that includes a receiving unit configured to receive data from USB, a change unit configured to change a destination of the received data into the HTTP server without changing a host name of the received data, and a transmission unit configured to transmit the received data to the HTTP server as an HTTP request, performing the steps of
receiving an HTTP request;
determining whether or not the HTTP request is the HTTP request that has been transmitted to the image forming apparatus based on the host name of the HTTP request;
determining whether or not a port number of the HTTP request is the same port number as a port number of the HTTP server;
determining whether or not the HTTP request is the HTTP request that has been transmitted from the converter based on a source address of the HTTP request;
performing processing according to the HTTP request in a case where the HTTP request is determined to be the HTTP request that has been transmitted to the image forming apparatus based on the host name of the HTTP request and the port number of the HTTP request is determined to be the same port number as the port number of the HTTP server; and
transmitting an error response for the HTTP request in a case where the HTTP request is determined to be the HTTP request that has been transmitted to the image forming apparatus based on the host name of the HTTP request,
wherein the processing comprises performing processing according to the HTTP request in a case where the HTTP request is determined to be the HTTP request that has been transmitted from the converter based on a source address of the HTTP request even though the port number of the HTTP request is determined not to be the same port number as the port number of the HTTP server; and
wherein the transmitting comprises transmitting an error response for the HTTP request in a case where the port number of the HTTP request is determined not to be the same port number as the port number of the HTTP server and the HTTP request is determined not to be the HTTP request that has been transmitted from the converter based on a source address of the HTP request.

* * * * *